US009446701B2

(12) United States Patent
Nishiyama et al.

(10) Patent No.: US 9,446,701 B2
(45) Date of Patent: Sep. 20, 2016

(54) MOUNTING DEVICE FOR OBJECT TO BE MOUNTED

(71) Applicant: HONDA MOTOR CO., LTD., Tokyo (JP)

(72) Inventors: Kimito Nishiyama, Wako (JP); Daisuke Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/761,174

(22) PCT Filed: Jan. 28, 2014

(86) PCT No.: PCT/JP2014/051832
§ 371 (c)(1),
(2) Date: Jul. 15, 2015

(87) PCT Pub. No.: WO2014/115890
PCT Pub. Date: Jul. 31, 2014

(65) Prior Publication Data
US 2015/0367767 A1    Dec. 24, 2015

(30) Foreign Application Priority Data
Jan. 28, 2013 (JP) ................................. 2013-012991

(51) Int. Cl.
*B60P 1/43* (2006.01)
*A61G 3/06* (2006.01)
(Continued)

(52) U.S. Cl.
CPC ................. *B60P 1/43* (2013.01); *A61G 3/062* (2013.01); *B60N 99/00* (2013.01); *B60P 3/00* (2013.01); *B65G 69/28* (2013.01)

(58) Field of Classification Search
CPC ............. B60P 1/43; B60P 1/48; B60P 1/438; B60P 1/436; B60P 1/435; B60P 1/433; B60P 1/44; B60P 1/4407; B60P 3/00; B60P 3/122; B60P 3/41; B60N 99/00; B65G 69/28; B62B 5/003; A61G 6/06; A61G 6/006; A61G 6/061; A61G 6/062; A61G 6/063
See application file for complete search history.

(56) References Cited

FOREIGN PATENT DOCUMENTS

CN    201107984 Y    9/2008
CN    102065817 A    5/2011
(Continued)

OTHER PUBLICATIONS

Australian Examination Report dated Feb. 23, 2016.
(Continued)

*Primary Examiner* — Kaitlin Joerger
(74) *Attorney, Agent, or Firm* — Rankin, Hill & Clark LLP

(57) ABSTRACT

A mounting device includes a slope including: a main plate for mounting a wheelchair; a vehicle-side plate provided between a vehicle and an edge of the main plate and having at least one plate; and a ground to be contacted-side plate provided between a surface of ground to be contacted and the other edge of the main plate and having at least one plate. The main plate can be raised and lowered between low and high positions when the ground to be contacted-side plate is in contact with the ground. The mounting device is also provided with: an electric winch that can tow the wheelchair along the slope; a slope driving mechanism that drives the main plate; and a control unit that, on the basis of the drive state of one of the slope driving mechanism and the electric winch, controls the drive state of the other.

11 Claims, 16 Drawing Sheets

(51) Int. Cl.
  *B60N 99/00*  (2006.01)
  *B60P 3/00*  (2006.01)
  *B65G 69/28*  (2006.01)

(56) References Cited

FOREIGN PATENT DOCUMENTS

| | | |
|---|---|---|
| DE | 298 14 814 U1 | 12/1998 |
| EP | 2 338 454 A1 | 6/2011 |
| GB | 2 170 174 A | 7/1986 |
| JP | 2001-276135 A | 10/2001 |
| JP | 2002-263138 A | 9/2002 |
| JP | 2003-118536 A | 4/2003 |
| JP | 2006-271661 | 10/2006 |
| JP | 2009-066053 | 4/2009 |
| JP | 2010-143302 A | 7/2010 |
| JP | 2012-096857 | 5/2012 |
| WO | 00/09060 | 2/2000 |

OTHER PUBLICATIONS

Chinese Office Action dated May 23, 2016.

FIG. 1
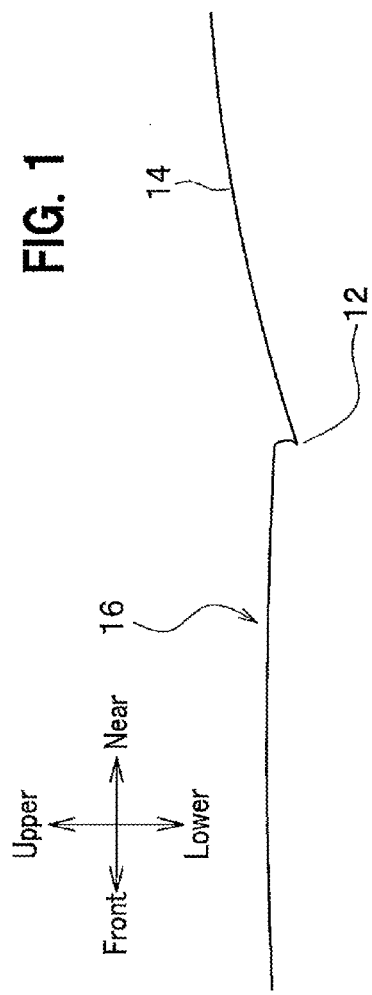
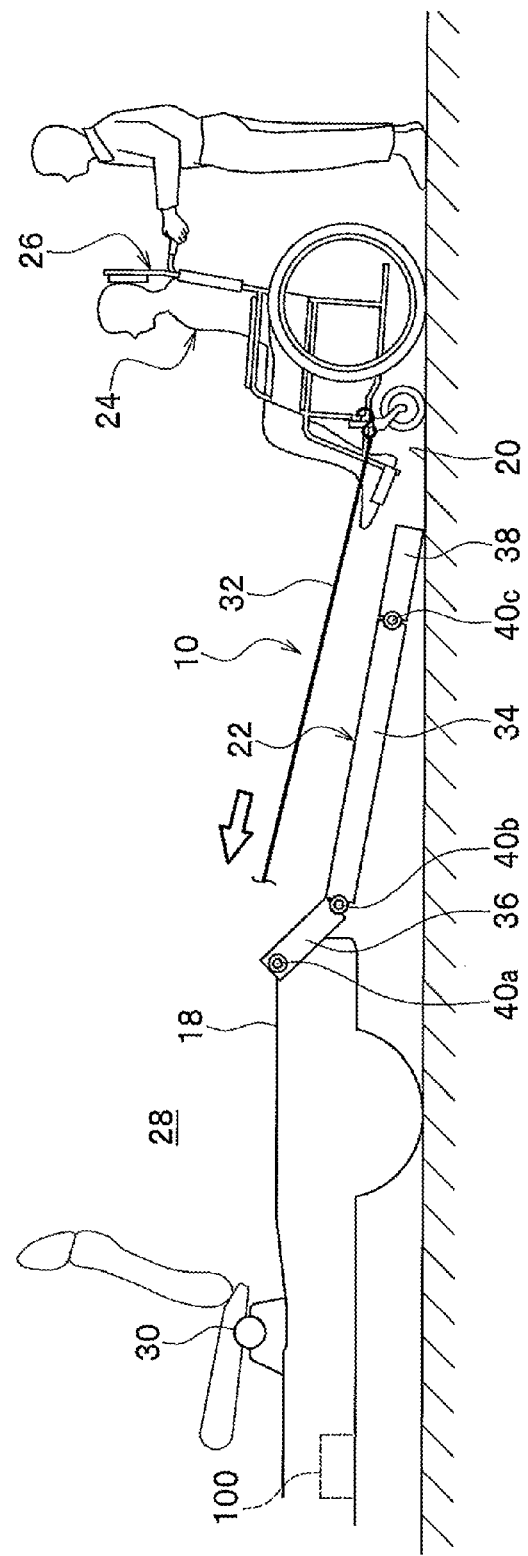

MOUNTING DEVICE FOR OBJECT TO BE MOUNTED

TECHNICAL FIELD

The present invention relates to a mounting device for mounting onto a vehicle an object to be mounted, for example, a wheelchair on which a care receiver is sitting.

BACKGROUND ART

For example, Patent Document 1 discloses a wheelchair lifting device that lifts a wheelchair along a slope bridged between a floor surface at the rear opening of a vehicle body and a road surface. For this wheelchair lifting device, a structure is adopted that lifts a wheelchair along a slope while a passenger is sitting on the wheelchair, by winding belts back by electrical winches, the belts being engaged and stopped by the wheelchair.

RELATED ART DOCUMENT

Patent Document

Patent Document 1: Japanese Patent Application Publication No. 2006-271661

DISCLOSURE OF THE INVENTION

Problems to be Solved by the Invention

In recent years, a battery is mounted under a floor, and there is an increase in the number of vehicles (for example, hybrid vehicles and electrical vehicles) whose opening at the tail gate on the rear part of the vehicle body is higher from the ground compared with conventional vehicles. If a wheelchair lifting device disclosed by Patent Document 1 is applied to such a vehicle whose opening is high from the ground, the gradient angle and the longitudinal length of a slope when the slope comes in contact with the ground are affected, and an excessive load is applied to an electrical winch for winding back a belt.

In this situation, it is conceivable to form a slope by plural plate bodies and connect neighboring plate bodies by plural rotation shafts. In this case, if an object to be mounted is mounted between neighboring plate bodies, straddling rotational shafts, when the slope is displaced by rotating rotational shafts, a problem is caused that smooth movement of the object to be mounted becomes difficult.

The present invention has been developed, addressing the above-described problems, and an object of the invention is to provide a mounting device for mounting an object to be mounted, the mounting device being capable of smoothly moving the object to be mounted.

Means for Solving the Problems

In order to attain the above-described object, a mounting device, for an object to be mounted, according to the invention includes: a slope including a main plate body onto which an object to be mounted is mounted, a vehicle-body-side plate body formed by at least one plate body and arranged between one end of the main plate body and a vehicle body, and a ground-contact-side plate body formed by at least one plate body and arranged between the other end of the main plate body and a contact-ground surface, wherein the main plate body is movable up and down between a low position and a high position in a state that the ground-contact-side plate body is in contact with ground; a winch capable of towing the object to be mounted along the slope; a slope driving unit for driving the main plate body; and a control unit that, based on driving state of either one of the slope driving unit and the winch, controls driving state of the other one of the slope driving unit and the winch.

According to this aspect of the present invention, it is possible to control the slope and the winch, making the slope and the winch collaborate with each other, which enables smoother movement of the object to be mounted.

The mounting device for an object to be mounted may be arranged such that when either one of the slope driving unit and the winch is driving, the control unit prohibits driving of the other one of the slope driving unit and the winch.

According to this aspect of the invention, when one of the slope driving unit and the winch is driving, driving of the other one is prohibited, and it is thereby possible to prevent simultaneous operation of the slope and the winch and reduce strange feeling given to a person on the object to be mounted when the object to be mounted is, for example, a wheelchair or the like.

The mounting device for an object to be mounted may include: a slope height detecting unit for detecting height of the main plate body, wherein the control unit switches permission and prohibition of driving of the winch, based on the height of the main plate body.

According to this aspect of the invention, it is possible to control the slope and the winch, making the slope and the winch collaborate with each other, based on the height of the main plate body, which is an example of the driving state of the slope driving unit, and it is thereby possible to more smoothly move the object to be mounted.

The mounting device for an object to be mounted may be arranged such that when the main plate body moves up, if the main plate body is at a position higher than or equal to a first predetermined height, the control unit permits driving of the winch toward a boarding direction. Further, the mounting device for an object to be mounted may be arranged such that when the main plate body moves down, if the main plate body is at a position lower than or equal to a second predetermined height, the control unit permits driving of the winch toward an alighting direction.

According to this aspect of the invention, as the mounting device makes the wheelchair pass unevennesses formed on the slope in a state that the unevenesses are small, it is possible, for example, to shorten the time taken in boarding or alighting of the wheelchair while reducing strange feeling given to the care receiver on the object to be mounted, if the object to be mounted is a wheelchair or the like.

The mounting device for an object to be mounted may be arranged such that: slope includes plural rotation shafts provided between the vehicle body and the vehicle-body-side plate body and between the respective plate bodies; the mounting device includes a slope angle detecting unit for detecting rotation angle of the rotation shaft; and the control unit switches permission and prohibition of driving of the winch by the winch driving unit, based on the rotation angle.

According to this aspect of the invention, based on the rotation angle of the rotation shaft, which is an example of the driving state of the slope driving unit, it is possible to control the slope and the winch, making the slope and the winch collaborate with each other, and it is thereby possible to more smoothly move the object to be mounted.

The mounting device for an object to be mounted may be arranged such that: the winch includes a towing member connected to the object to be mounted and a drum capable of winding back and drawing out the towing member; the mounting device includes a rotation amount detecting unit for detecting a rotation amount of the drum; and the control unit switches permission and prohibition of driving of the slope driving unit, based on the rotation amount.

According to this aspect of the invention, based on the rotation amount of the drum, which is an example of the driving state of the winch, it is possible to control the slope and the winch, making them collaborate with each other, and it is thereby possible to more smoothly move the object to be mounted.

The mounting device for an object to be mounted may be arranged such that the control unit computes a draw-out length of the towing member from the drum, based on the rotation amount and thickness of the towing member, and switches permission and prohibition of driving of the slope driving unit, based on the draw-out length.

According to this aspect of the invention, the position of the object to be mounted can be more accurately computed, and based on a computation result by this, it is possible to control the slope and the winch, making the slope and the winch collaborate with each other, and it is thereby possible to more smoothly move the object to be mounted.

The mounting device for an object to be mounted may be arranged such that: the mounting device comprises a storage detecting unit for detecting a fact that the towing member has been stored in the storing section; and when the towing member has been stored into the storing section, the control unit resets a detection result obtained from the rotation amount detecting unit.

According to this aspect of the invention, it is possible to reduce occurrence of error in the rotation amount detecting unit caused by plural times of usage.

Advantage of the Invention

According to the present invention, it is possible to obtain a mounting device for mounting an object to be mounted, the mounting device being capable of smoothly moving the object to be mounted.

BRIEF DESCRIPTION OF THE DRAWINGS

FIG. 1 is a side view of a state that a mounting device in an embodiment according to the present invention is applied to a vehicle;

EMBODIMENT FOR CARRYING OUT THE INVENTION

Figure 2:
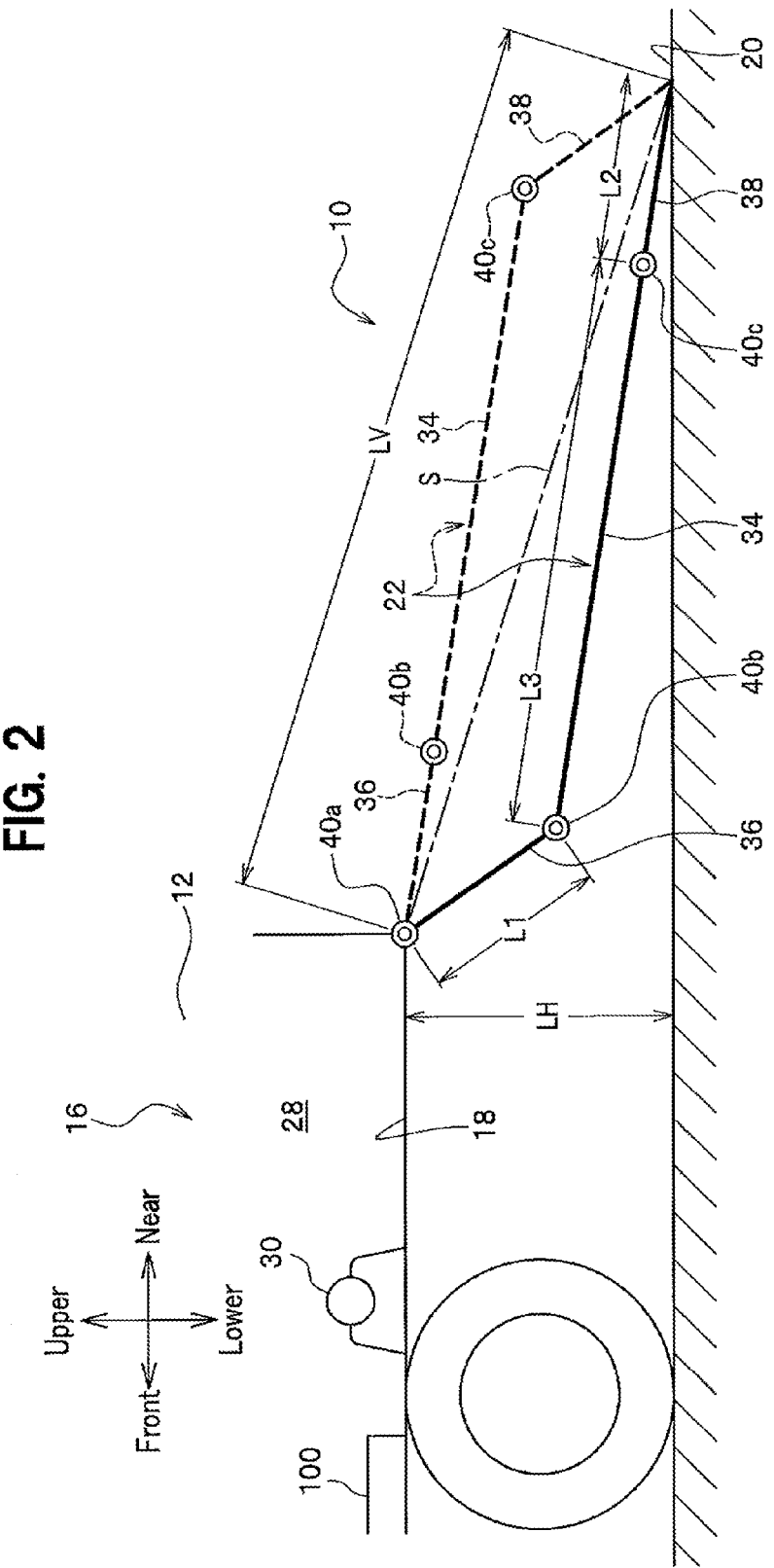
FIG. 2 is a schematic view of the vehicle and a slope shown in FIG. 1.

An embodiment of the present invention will be described below in detail, referring to the drawings, as appropriate. FIG. 1 is a side view of a state that a mounting device in an embodiment according to the present invention is applied to a vehicle. FIG. 2 is a schematic view of the vehicle and a slope shown in FIG. 1. Incidentally, 'front-rear' and 'upper-lower' represented by arrows in respective figures respectively represent the front-rear direction and the upper-lower direction with respect to the vehicle, and 'left-right' represents the left-right direction (vehicle transverse direction) in a view from the driver's seat.

As shown in FIG. 1, a mounting device 10 in an embodiment according to the present invention is applied, for example, to a vehicle 16 provided with a backdoor (tail gate) 14 for opening and closing an opening section 12 at the rear part of the vehicle body. Incidentally, application of the mounting device 10 is not limited to the vehicle 16 having the backdoor 14, and the mounting device 10 is also applicable, for example, to a vehicle having left and right rear slide doors (not shown).

The mounting device 10 is provided with a slope 22 bridged between a floor surface 18 of the opening section 12 at the rear part of the vehicle body and a contact-ground (road surface) surface 20. The slope 22 is used to draw in a wheelchair (an object to be mounted) 26 on which a care receiver 24 is riding on into a space 28 at the rear part of the vehicle compartment and draw out the wheelchair 26 outside the vehicle.

Left-right paired electric winches 30 are provided in the vehicle compartment of the vehicle 16. Each of the Left-right paired electric winches 30 is provided with a drum 31 (see FIG. 6) capable of winding back a belt 32 engaged with and stopped by the wheelchair 26 by rotation of a motor 33 (see FIG. 6) and also drawing out the belt 32, so that the wheelchair 26 on which the care receiver 24 is riding can be drawn in into the space 28 at the rear part of the vehicle. Incidentally, the left-right pared electric winches 30 are disposed, for example, in a gap along the vehicle transverse direction between the vehicle body and seats.

As shown in FIG. 2, the slope 22 is constructed by: a main plate body 34 on which the wheelchair 26 is mounted; a vehicle-body-side plate body 36 formed by a plate body provided between one end, on the vehicle front side, of the main plate body 34 and an opening section (vehicle body) 12 at the vehicle body rear part; and a ground-contact-side plate body 38 formed by a plate body provided between the other end, on the vehicle rear side, of the main plate body 34 and the contact-ground surface 20.

Each of the main plate body 34, the vehicle-body-side plate body 36, and the ground-contact-side plate body 38 is a flat plate in a rectangular shape in a plan view, and may be constructed, for example, by a hollow body of a resin material or a light metal material. This is aimed at reducing the weight of the slope 22.

In the present embodiment, the main plate body 34 is constructed by a single plate body, however, the main plate body 34 may be formed for example by the entirety of a plurality of plates which are expanded such that neighboring plural plates slide with each other. Further, each of the vehicle-body-side plate body 36 and the ground-contact-side plate body 38 is not limited to a single plate body, and may be constructed by plural plate bodies.

Figure 8:
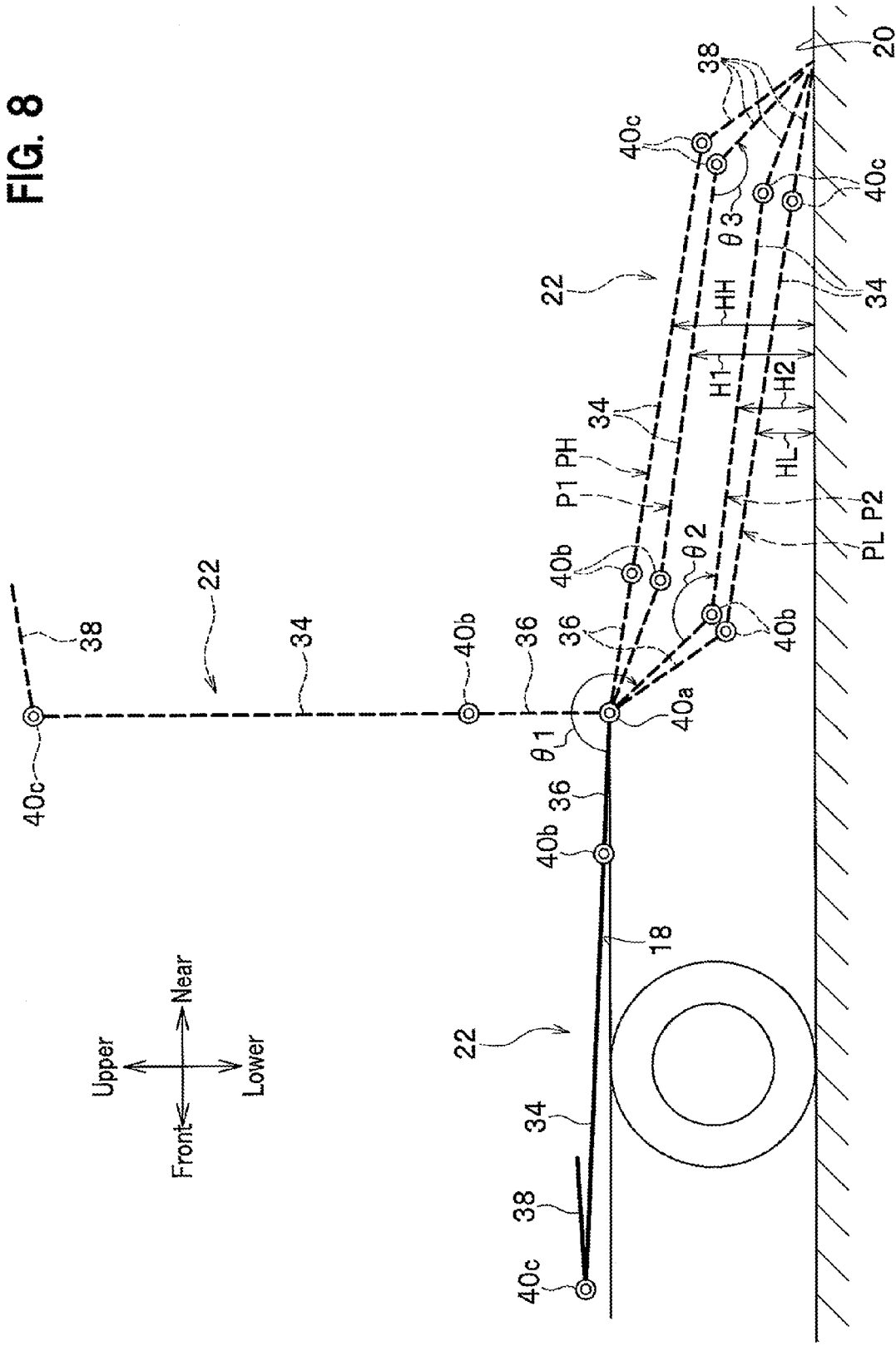
FIG. 8 is a schematic view showing the stored state, the standing fixed state, and the ground-contact state of the slope.

As shown in FIG. 1, FIG. 2, or FIG. 8, a first rotation shaft 40a is provided between the floor surface 18 of the vehicle 16 and the vehicle-body-side plate body 36, the first rotation shaft 40a extending along the vehicle transverse direction. The vehicle-body-side plate body 36 is rotatably connected with the floor surface 18 on the fixed side, with the axial center of the first rotation shaft 40a as the rotation center. Further, a second rotation shaft 40b is provided between the vehicle-body-side plate body 36 and the main plate body 34, the second rotation shaft 40b extending along the vehicle transverse direction. The vehicle-body-side plate body 36 and the main plate body 34 are rotatably connected with each other, with the axial center of the second rotation shaft 40b as the rotation center. Still further, a third rotation shaft 40c is provided between the main plate body 34 and the ground-contact-side plate body 38, the third rotation shaft 40c extending along the vehicle transverse direction. The main plate body 34 and the ground-contact-side plate body 38 are rotatably connected with each other, with the axial center of the third rotation shaft 40c as the rotation center.

As shown in FIG. 2, dimension L1 of the vehicle-body-side plate body 36 in a direction (vehicle front-rear direction) perpendicular to the first to third rotation shafts 40a to 40c is set the same as the dimension L2 of the ground-contact-side plate body 38 in a direction (vehicle front-rear direction) perpendicular to the first to third rotation shafts 40a to 40c (L1=L2). That is, the vehicle-body-side plate body 36 and the ground-contact-side plate body 38 are formed the same.

By making the dimension L1 of the vehicle-body-side plate body 36 and the dimension L2 of the ground-contact-side plate body 38 be the same (L1=L2), it is possible to displace (change the position of) the main plate body 34 between the low position (see the thick solid line in FIG. 2) and the high position (see the thick dashed line in FIG. 2), in a state of maintaining the angle of the main plate body 34 to be a certain angle. Accordingly, the stability of the wheelchair 26 during displacement (change in the position) of the main plate body 34 can be improved.

As shown in FIG. 2, the dimension L3 of the main plate body 34 in a direction (vehicle front-rear direction) perpendicular to the first to third rotation shafts 40a to 40c is set larger than the dimension L1 of the vehicle-body-side plate body 36 in a direction (vehicle front-rear direction) perpendicular to the first to third rotation shafts 40a to 40c and the dimension L2 of the ground-contact-side plate body 38 in a direction (vehicle front-rear direction) perpendicular to the first to third rotation shafts 40a to 40c (L3>L1, L2).

By making the dimension L3 of the main plate body 34 larger than the L1 of the vehicle-body-side plate body 36 and the dimension L2 of the ground-contact-side plate body 38 (L3>L1, L2), the mounting allowing range (mounting allowing area), in which the wheelchair 26 can be displaced (changed in position) with stability, is ensured to be wide, and the stability of the wheelchair 26 during displacement of the slope 22 can be improved.

As shown in FIG. 2, the total (L1+L2+L3) of the dimension L1 of the vehicle-body-side plate body 36 in a direction (vehicle front-rear direction) perpendicular to the first to third rotation shafts 40a to 40c, the dimension L3 of the main plate body 34 in a direction (vehicle front-rear direction) perpendicular to the first to third rotation shafts 40a to 40c, and the dimension L2 of the of the ground-contact-side plate body 38 in a direction (vehicle front-rear direction) perpendicular to the first to third rotation shafts 40a to 40c, is set larger than the dimension LV of the virtual line S (see the thin alternate long and short dashed line in FIG. 2) connecting the axial center of the first rotation shaft and the contact-ground surface 20, the first rotation shaft being provided between the one end, on the vehicle front side, of the vehicle-body-side plate body 36 and the vehicle body ((L1+L2+L3)>LV).

By making the total of the dimension L1 of the vehicle-body-side plate body 36, the dimension L3 of the main plate body 34, and the dimension L2 of the ground-contact-side plate body 38 (L1+L2+L3) lager than the dimension LV of the virtual line S ((L1+L2+L3)>LV), the slope 22 can be displaced without moving the other end of the ground-contact-side plate body 38, the other end being in contact with the contact-ground surface 20.

The mounting device 10 is provided with a slope driving mechanism 42 (see FIG. 3 and FIG. 4) for respectively rotating the second rotation shaft 40b and the third rotation shaft 40c. Further, the mounting device 10 is provided with a switching mechanism 44 (see FIG. 3 and FIG. 4) for switching a rotation permitting state in which the driving force by the slope driving mechanism 42 is transmitted so that the second rotation shaft 40b and the third rotation shaft 40c become rotatable, and a rotation prohibiting state in which the driving force by the slope driving mechanism 42 is blocked so that the first to third rotation shafts 40a to 40c become prohibited from rotating. The slope driving mechanism 42 and the switching mechanism 44 construct slope drive controlling means for driving the slope.

The slope 22 is arranged such that the main plate body 34 is displaced between the low position (the position of the thick solid line in FIG. 2) with respect to the upper-lower direction and the high position (the position of the thick dashed line in FIG. 2), by rotating the second rotation shaft 40b and the third rotation shaft 40c by the slope driving mechanism 42. The such arranged main plate body 34 is translated along the upper-lower direction between the low position and the high position while maintaining the gradient angle at a certain angle (see FIG. 8).

Arrangement is made such that, when the main plate body 34 is at the low position (the position of the thick solid line in FIG. 2) with respect to the upper-lower direction, the axial line of the main plate body 34 along the vehicle body front-rear direction and the axial line of the ground-contact-side plate body 38 along the vehicle body front-rear direction are on one line. Arrangement is made such that, when the main plate body 34 is at the low position, the axial line of the vehicle-body-side plate body 36 along the vehicle body front-rear direction is inclined by a certain angle from the main plate body 34 with a descending gradient toward the main plate body 34 side (vehicle rear side).

Arrangement is made such that, when the main plate body 34 is at the high position (the position of the thick dashed line in FIG. 2) with respect to the upper-lower direction, the axial line of the vehicle-body-side plate body 36 along the vehicle body front-rear direction and the axial line of the main plate body 34 along the vehicle body front-rear direction are on one line. Arrangement is made such that, when the main plate body 34 is at the high position, the axial line of the ground-contact-side plate body 38 along the vehicle body front-rear direction is inclined by a certain angle from the main plate body 34 with a descending gradient toward the vehicle rear side.

Slope driving mechanisms 42 are respectively provided to the second rotation shaft 40b and the third rotation shaft 40c, and these slope driving mechanism 42 are configured the same. Accordingly, the slope driving mechanism 42 for rotating the third rotation shaft 40c will be described in detail, while the description of the slope driving mechanism 42 for rotating the second rotation shaft 40b will be omitted.

Figure 3:
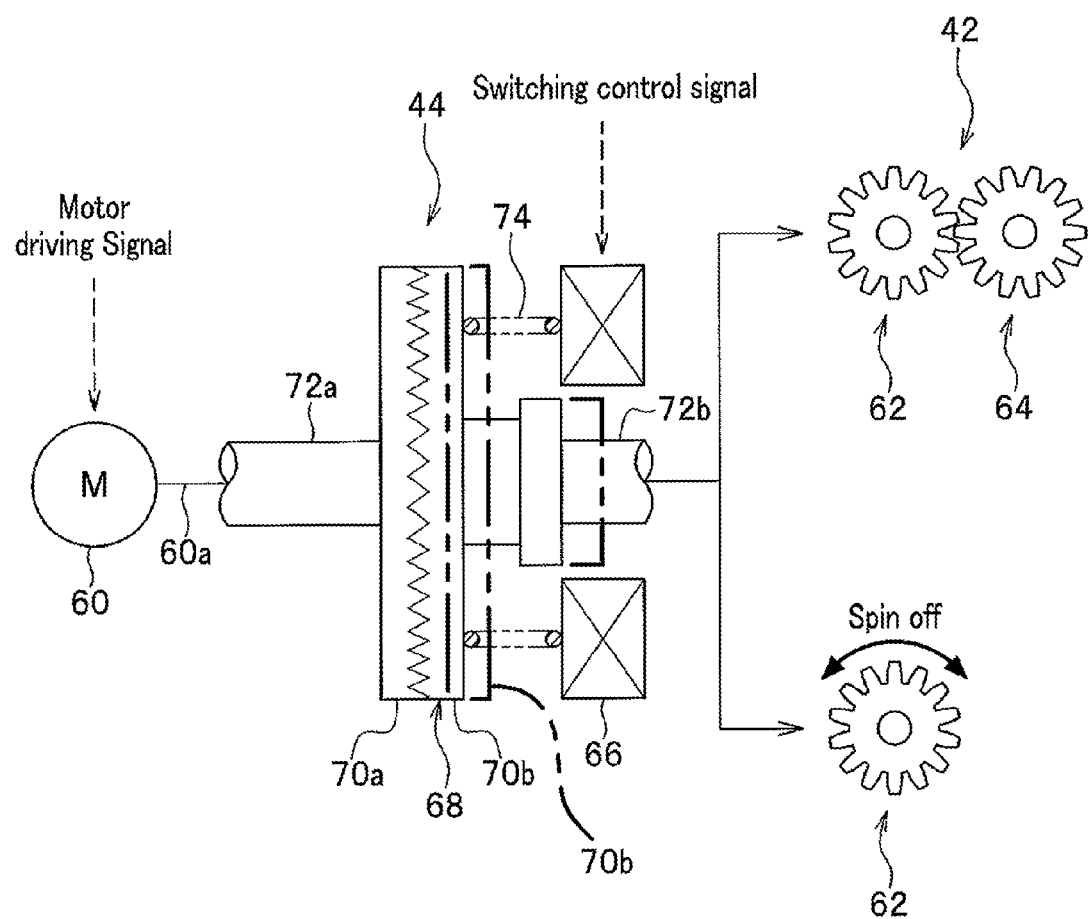
FIG. 3 is a schematic view showing the structure of a driving mechanism for rotating a rotation shaft and a switching mechanism for switching a rotation permitted state and a rotation prohibited state of the rotation shaft.
Figure 4:
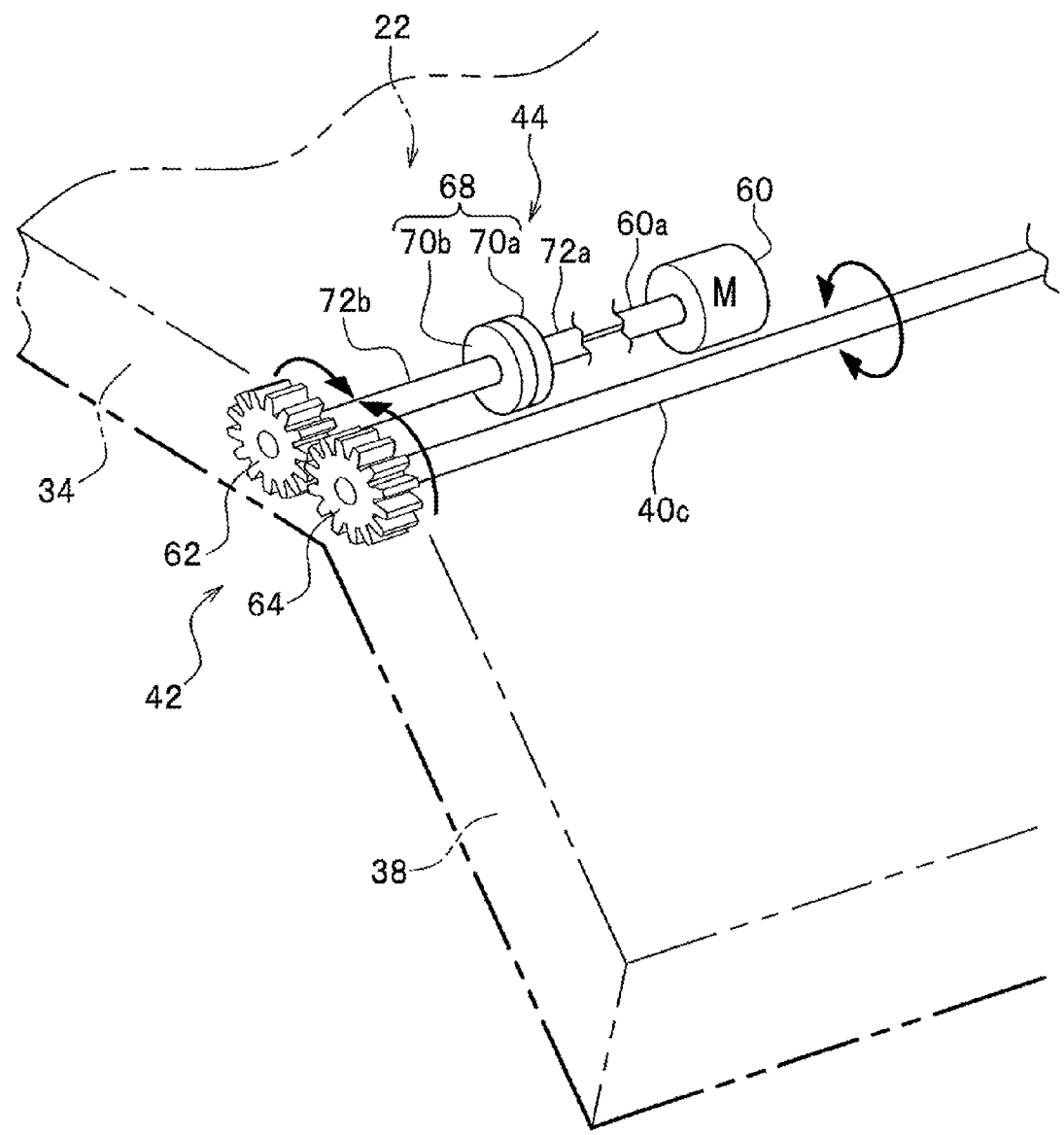
FIG. 4 is a perspective view of an overview structure showing a state that the driving mechanism and the switching mechanism are applied to a third rotation shaft.

FIG. 3 is a schematic view showing the arrangement of a driving mechanism for rotating a rotation shaft and a switching mechanism for switching a rotation permitted state and a rotation prohibited state of the rotation shaft. FIG. 4 is a perspective view of an overview structure showing a state that the slope driving mechanism and the switching mechanism are applied to the third rotation shaft.

As shown in FIG. 3 and FIG. 4, the slope driving mechanism 42 includes a motor 60 for rotating a motor shaft 60a in forward-reverse direction with a battery, not shown, as a power supply source, a driving side gear 62 connected with the motor 60 side through the switching mechanism 44, and a driven side gear 64 connected with the third rotation shaft 40c and arranged engageably with the driving side gear 62.

As shown in FIG. 3, the switching mechanism 44 is configured, for example, as an electromagnetic clutch 68 provided with a solenoid 66. The clutch 68 includes the solenoid 66 formed by winding a coil in lamination, a pair of disc-shaped clutch plates 70a, 70b which are arranged such that a convex-concave surface and a concave-convex surface face each other to be connectably and disconnectably, a pair of shaft portions 72a, 72b connected to the central portions of the pair of clutch plates 70a, 70b, and a spring member 74 for pressing the other clutch plate 70b by spring force to connect the clutch plate 70b with the one clutch plate 70a. Incidentally, the clutch plate 70b adjacent to the solenoid 66 functions as a movable iron core (armature) drawn by the solenoid 66.

The one clutch plate 70a is connected with the motor shaft 60a through a coupling member, not shown, and the other clutch plate 70b is connected with driving side gear 62 through the shat portion 72b. In ON state, of the clutch 68, that the one clutch plate 70a and the other clutch plate 70b are connected, current is applied to the solenoid 66 whose excitation action generates electromagnetic force, and this electromagnetic force draws the other clutch plate 70b toward the solenoid 66 side. As the other clutch plate 70b is drawn, the other clutch plate 70b separates from the one clutch plate 70a by a certain distance so that the clutch 68 becomes into OFF state. By making the clutch 68 in OFF state, the third rotation shaft 40c becomes into a free state, and the respective plate bodies of the slope 22 can be manually rotated.

In ON state of the clutch 68, the driving side gear 62 and the driven side gear 64 engage with each other, and the rotation driving force by the motor 60 to which current is applied is transmitted to the third rotation shaft 40c so that the third rotation shaft 40c rotates in a predetermined direction. On the other hand, in OFF state of the clutch 68, the driving side gear 62 separates from the driven side gear 64 to become into non-engaged state (becomes into a spin-off state), in other words, transmission of the rotation driving force by the motor 60 to the third rotation shaft 40c is shut off.

In the present embodiment, the first rotation shaft 40a is not provided with a slope driving mechanism 42 and is always in a free state, however, the first rotation shaft 40a may also be provided with a slope driving mechanism 42.

Further, each of the left and right ends of the vehicle compartment rear end portion is provided with a storing section 201 for storing a hook 32a attached to the tip end of the belt 32 of the electric winch 30. In the present embodiment, the storing section 201 is a ring capable of engaging and stopping the hook 32a. Herein, the belt 32 and the hook 32a construct a towing member for towing the wheelchair 26.

Figure 6:
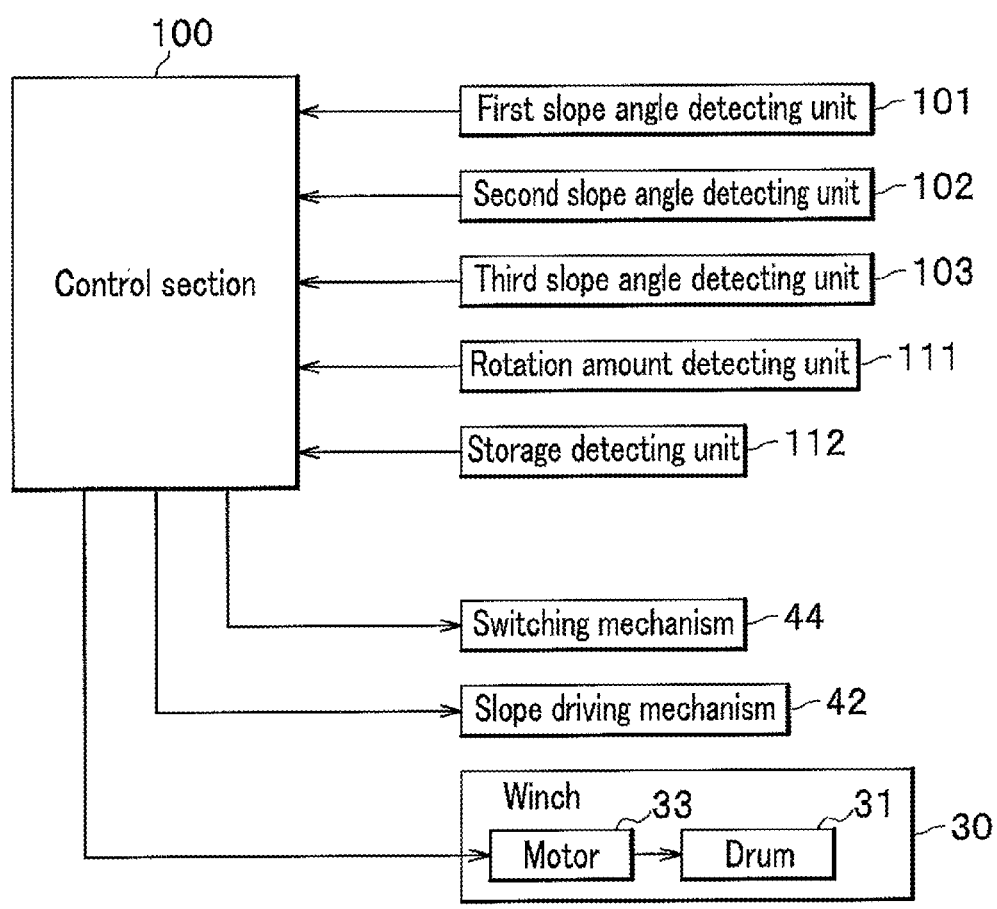
FIG. 6 is a block diagram showing the connection relationship with a control section.

In the following, a control section 100 disposed on the floor surface of the vehicle 16 will be described. FIG. 6 is a block configuration diagram showing the connection relationship with a control section.

Figure 5:
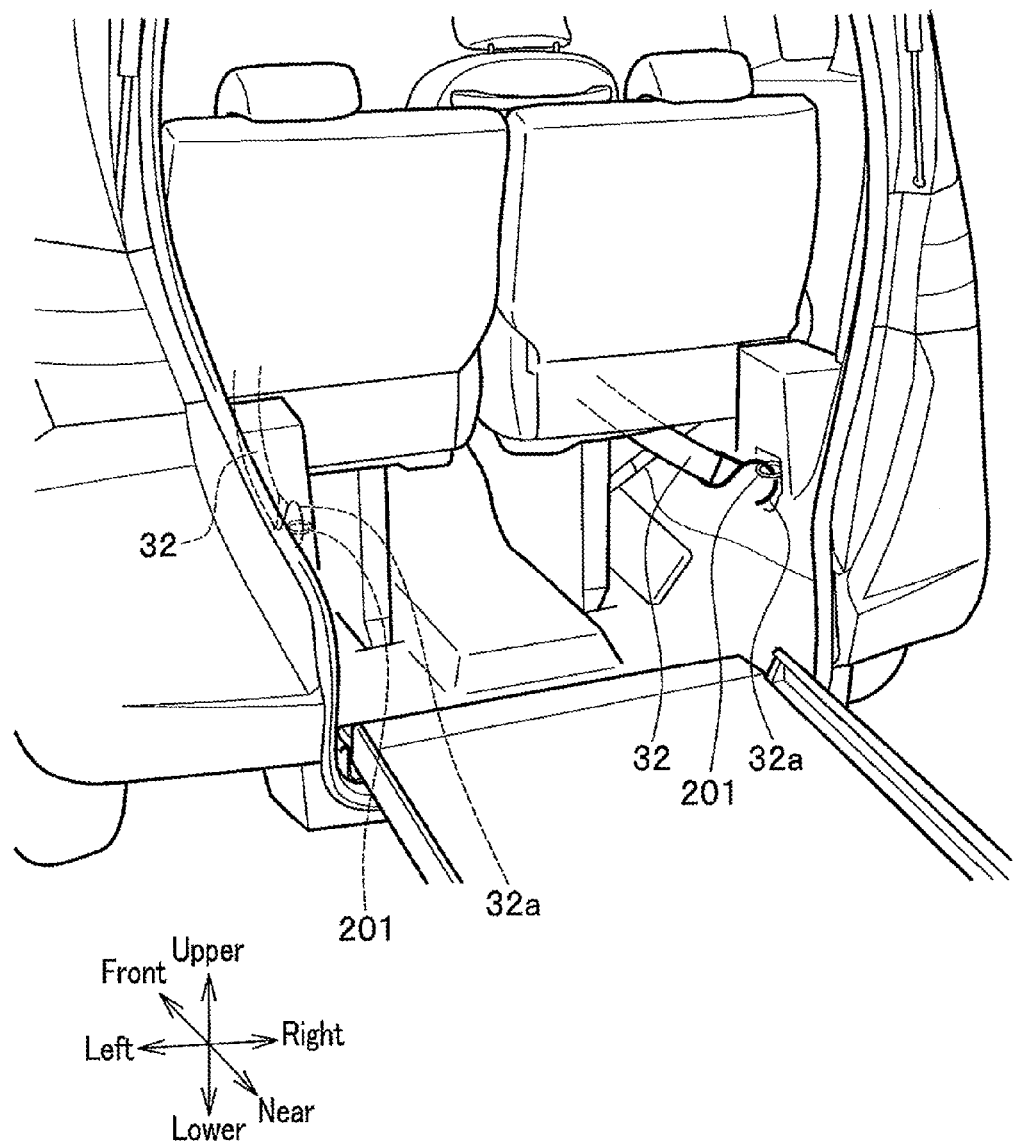
FIG. 5 is a schematic view showing a state that the hook of an electric winch is stored in a storing section.

As shown in FIG. 6, the control section (control means) 100 is connected with a first slope angle detecting unit 101 for detection of the rotation angle of the first rotation shaft 40a, a second slope angle detecting unit 102 for detection of the rotation angle of the second rotation shaft 40b, a third slope angle detecting unit 103 for detection of the rotation angle of the third rotation shaft 40c, a rotation amount detecting unit 111 for detection of the rotation amount of the drums 31, and storage detecting units 112 for detection of a fact that the belts 32 of the electric winches 30 have been stored in the storing section 201 (see FIG. 5).

Further, the control section 100 is electrically connected with the switching mechanism 44, and derives a switching control signal (electric signal) for the solenoid 66 of the switching mechanism 44 to thereby control switching between ON state (a state that the clutch 68 is connected with the motor 60 so as to permit rotation of the second rotation shaft 40b and the third rotation shaft 40c by the motor 60, and the second rotation shaft 40b and the third rotation shaft 40c cannot be manually rotated when the motor 60 is stopped) and OFF state (a state that the clutch 68 is separated from the motor 60 so as to prohibit rotation of the second rotation shaft 40b and the third rotation shaft 40c by the motor 60, wherein manual rotation is permitted). Further, the control section 100 is electrically connected with the slope driving mechanism 42 and derives a motor driving signal for the motor 60 of the slope driving mechanism 42 to thereby control driving of the motor 60. Still further, the control section 100 is electrically connected with a winch driving mechanism 33 and derives a driving signal for the winch driving mechanism 33 to thereby control the driving of the drum 31 of the electric winch 30.

The first slope angle detecting unit 101 is a sensor for detection of an angle ($\theta 1$ (see FIG. 8)) formed by the floor surface 18 of the vehicle body and the vehicle-body-side plate body 36, wherein the angle $\theta 1$ is $\theta 1 = 0$ degree in a stored state and the angle $\theta_1$ becomes maximum $\theta_1$=maximum at the low position PL in the ground-contact state.

The second slope angle detecting unit 102 is a sensor for detection of an angle $\theta_2$ (see FIG. 8) formed by the vehicle-body-side plate body 36 and the main plate body 34, wherein the angle $\theta_2$ is $\theta_2$=minimum at the low position in the ground-contact state and the angle $\theta_2$ is $\theta_2$=maximum=180 degrees at the high position PH in the ground-contact state.

The third slope angle detecting unit 103 is a sensor for detection of an angle $\theta_3$ (see FIG. 8) formed by the main plate body 34 and the ground-contact-side plate body 38, wherein the angle $\theta_3$ is $\theta_3$=minimum=0 degree in the stored state, and the angle $\theta_3$ becomes $\theta_3$=maximum=180 degrees at the low position PL in the ground-contact state.

Herein, as the angles $\theta_2$ and $\theta_3$ are parameters related to the height of the main plate body 34 from the contact-ground surface 20 in the ground-contact state of the slope 22, the second slope angle detecting unit 102 and the third slope angle detecting unit 103 can also be said to be a slope height detecting unit for detecting the height of the main plate body 34. Further, as detection results obtained from the second slope angle detecting unit 102 and the third slope angle detecting unit 103 are parameter related to the height of the main plate body 34 of the slope 22 from the contact-ground surface, these parameters can be said to be parameters related to the driving state of the slope driving unit.

The rotation amount detecting unit 111 is configured by a rotation angle sensor, such as a rotary encoder, provided at the drum 31 of the electric winch 30. By detecting the rotation angle of the drum by a rotation angle sensor and detecting the winding back amount (lifting amount) of the belt 32 by the drum, the control section 100 can determine the mounted state of the wheelchair 26 on the main plate body 34 or the non-mounted state (the position of the wheelchair 26 on the slope 22). Herein, as a detection result obtained from the rotation amount detecting unit 111 is a parameter related to the draw-out length of the belt 32, this parameter can be said to be a parameter related to the driving state of the electric winch 30.

Incidentally, the rotation amount detecting unit 111 is not limited to a rotation angle sensor. For example, a pair of photo sensors which are respectively a light emitting element and a photo sensitive element may be arranged at the both side portions of the main plate body 34 such as to face each other so as to detect the mounted state of the wheelchair 26 by that a light projected from the light emitting element to the photo sensitive element is blocked by the wheelchair 26. Further, a weight sensor (strain gauge), not shown, may be arranged for the main plate body 34 so as to detect the mounted state by that a strain generated by the wheelchair 26 having moved onto the main plate body 34 is detected. Still further, a capacitance sensor (capacitance type adjacent sensor), not shown, may be arranged for the main plate body 34 such as to detect the mounted state by that the care receiver 24 riding on the wheelchair 26 moves close to an electrode, not shown, provided in the capacitance sensor and the capacitance of the electrode increases. Yet further, one constructed with plural piezoelectric elements in a matrix form may be arranged on the slope 22.

The control section 100 is provided with for example a CPU, a RAM, a ROM, and an input-output circuit and executes control by performing various computation processes, based on input of detection signals from respective detecting units, and programs and data stored in the ROM. Based on the driving state of either the slope driving unit (slope driving mechanism 42 and switching mechanism 44) or the electric winch 30, the control section 100 controls the driving state of the other. That is, the slope driving unit for the slope 22 and the electric winch 30 (namely, the motor 33) in the present embodiment are controlled by the control section 100 in association with each other. Particularly, when one of the slope driving unit and electric winch 30 is driven, the control section 100 prohibits driving of the other one of the slope driving unit and the electric winch 30, although the later-described operation example includes a partial exception. That is, in a state that driving is prohibited, even when a remote controller or the like is operated, the motor 60 of a slope driving mechanism 42 cannot be rotated (in other words, the main plate body 34 of the slope 22 cannot be moved upward nor downward), and the motor 60 of the electric winch 30 cannot be rotated (in other words, the drum 31 of the electric winch 30 cannot wind back nor draw out the belt 32).

Further, the control section 100 determines whether or not the slope 22 is on the ground, based on detection results obtained from the first to third slope angle detecting units 101 to 103, the dimensions L1 to L3 of the respective plate bodies 36, 34, and 38, and the dimension LH, which is the height from the contact-ground surface 20 to the first rotation shaft 40a, these dimensions being stored in advance.

Incidentally, without being limited to the above description, the method for determining ground-contact may be, for example, one that uses a detection result obtained from a ground-contact detecting unit constructed by a limit switch disposed below the end portion, on the vehicle rear side, of the ground-contact-side plate body 38. When a detection element provided in the limit switch comes in contact with the contact-ground surface 20, a ground-contact state is detected. Incidentally, the ground-contact detecting unit is not limited to a limit switch, and a non-contact sensor such as a reflection photo sensor may be used.

Further, the control section 100 can recognize the height of the main plate body 34 from the contact-ground surface 20, based on at least one of detection results obtained from the second slope angle detecting unit 102 and the third slope angle detecting unit 103.

For example, in the ground-contact state, if a detection result obtained from the third slope angle detecting unit 103 is 180 degrees, the control section 100 recognizes that the slope 22 is at the low position PL (see FIG. 8), and if a detection result obtained from the second slope angle detecting unit 102 is 180 degrees, the control section 100 recognizes that the slope 22 is at the high position PH (see FIG. 8). The angles of the second rotation shaft 40b and the third rotation shaft 40c at the respective positions PL, PH, P1, and P2 are stored in advance in the control section 100, and the control section 100 can recognize the driving state of the slope driving unit (slope driving mechanism 42), using a value stored in advance.

Further, based on the rotation amount of the drum 31 detected by the rotation amount detecting unit 111 and the diameter of the drum 31 stored in advance, the control section 100 computes the draw-out length of the belt 32 of the electric winch 30, and based on a computation result, the control section 100 switches permission and prohibition of driving the slope driving unit (the slope driving mechanism 42). Still further, in the present embodiment, based on the thickness of the belt 32 stored in advance, the control section 100 can adjust the draw-out length of the belt 32 of the electric winch 30.

Further, when the storage detecting unit 112 has detected that the hook 32a of the electric winches 30 has been stored into the storing section 201, the control section 100 resets the detection result obtained from the rotation amount detecting unit 111. Incidentally, depending on the installation place of the storing section 201, and depending on the state of the seat and the stored state of luggage and the like, the draw-out length of the belt 32 of the electric winch 30 in the stored state of the hook 32*a* may change. In such a case, after confirmation of the state of the seat and the like by a user, based on operation a remote controller not shown and detection of storage by the storage detecting unit 112, the control section 100 can control the electric winch 30 to wind back the belt 32 in a state that the hook 32*a* is stored in the storing section 201, and reset a detection result obtained from the rotation amount detecting unit 111 in a state that the slack of the belt 32 is removed.

Figure 7:
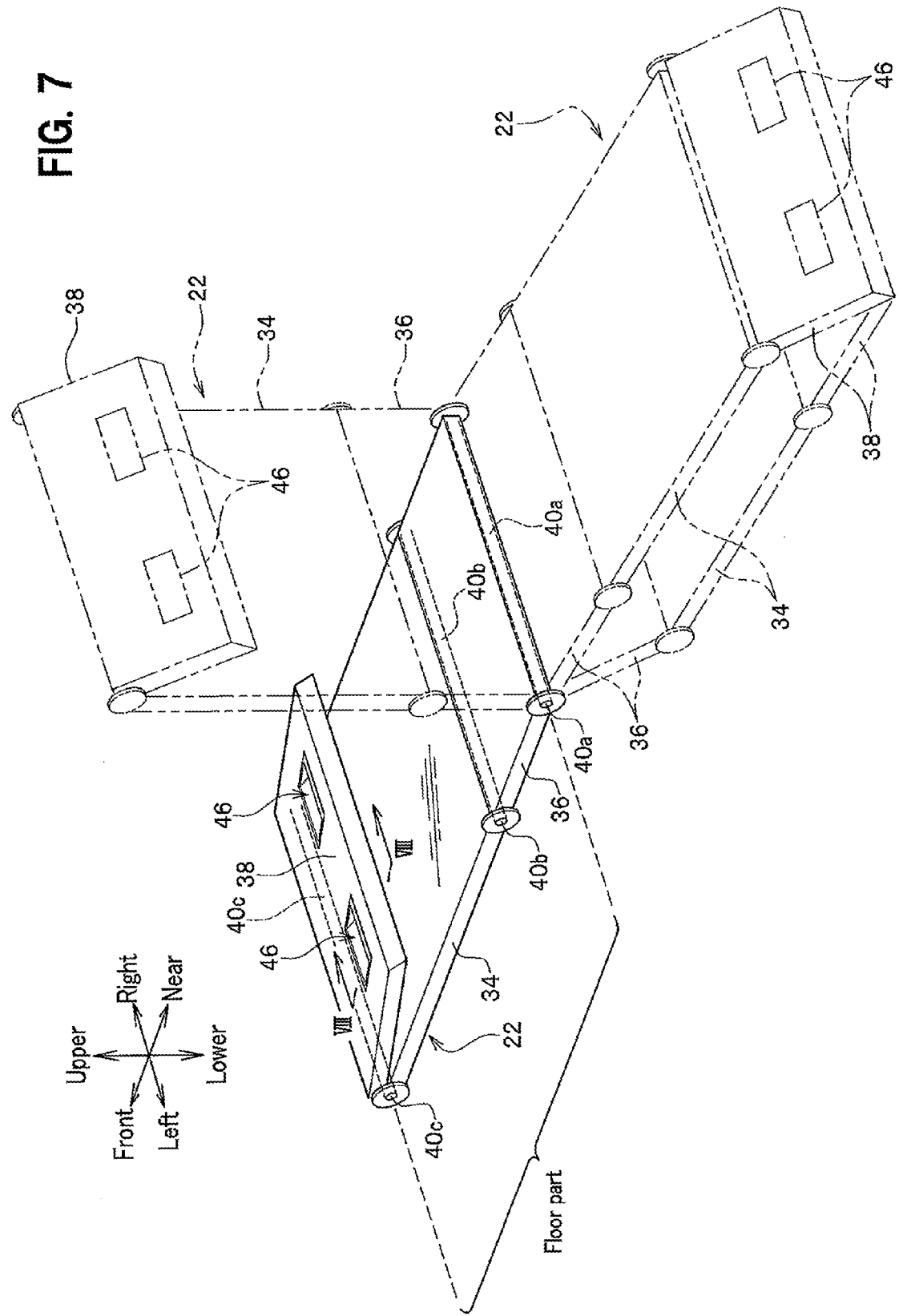
FIG. 7 is an illustration showing the stored state, the standing fixed state, and the ground-contact state of the slope.
Figure 9:
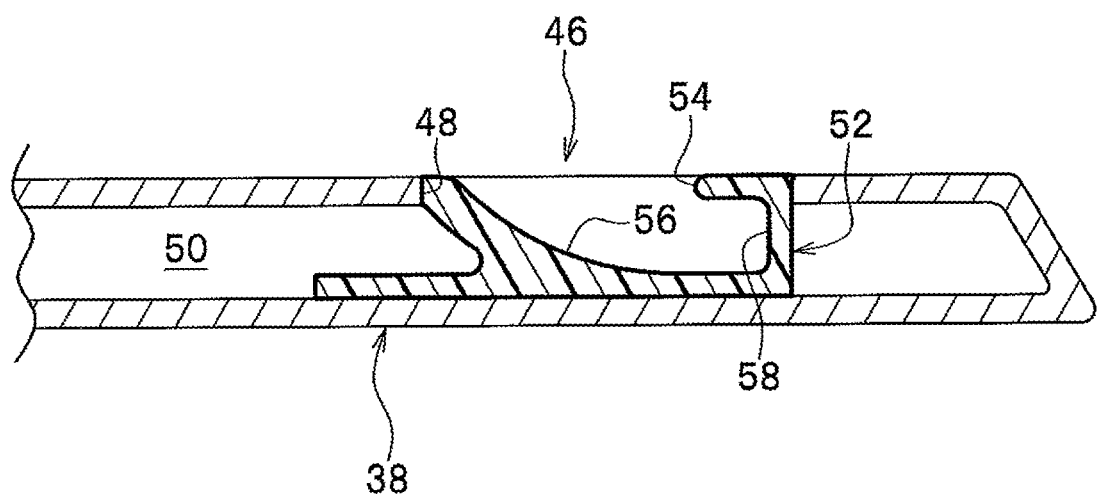
FIG. 9 is a vertical cross-sectional view taken along line VIII-VIII in FIG. 7.

FIG. 9 is a vertical cross-sectional view taken along line VIII-VIII in FIG. 7.

A left-right pair of grip sections 46 gripped, for example, by a care receiver (operator) is provided on the top surface of the ground-contact-side plate body 38. As shown in FIG. 9, each of the grip sections 46 has a casing 52 stored into a hollow portion 50, being inserted from a rectangular opening portion 48 of the ground-contact-side plate body 38. The casing 52 has an engagement protruding portion 54 protruding along the top surface of the ground-contact-side plate body 38, a curved portion 56 having a curved surface gradually curving downward from the top surface of the ground-contact-side plate body 38, and a standing wall 58 connecting the engagement protruding portion 54 and the curved portion 56.

FIG. 7 is an illustration showing the stored state of the slope stored in the vehicle compartment, the standing fixed state of the slope, and the ground-contact state of the slope wherein the slope is moved out of the vehicle and the other end is grounded on the contact-ground surface. FIG. 8 is a schematic view showing the above-describes states.

After being moved from the stored state through the standing fixed state to outside the vehicle, the slope 22 turns into the ground-contact state that the other end, in the vehicle front-rear direction, of the slope 22 is grounded on the contact-ground surface 20. In the stored state of the slope 22 in the vehicle compartment, the main plate body 34 and the vehicle-body-side plate body 36 are substantially in a horizontal state, and the ground-contact-side plate body 38 is in a state of being bent at a sharp angle with respect to the main plate body 34 and the vehicle-body-side plate body 36, with the third rotation shaft 40*c* as the bending point. In this stored state, as shown in FIG. 7, the pair of grip sections 46 are arranged at positions on the top surface of the ground-contact-side plate body 38, the positions being adjacent to the opening section 12 at the rear part of the vehicle body (see FIG. 1). Accordingly, for example, even if a care taker does not enter the vehicle compartment, it is possible to easily make the slope 22 contact with the ground, gripping the grip sections 46 from outside the vehicle through the opening section 12 at the rear part of the vehicle body The mounting device 10 in the present embodiment is basically arranged as described above. The operation and the advantages of the mounting device 10 will be described below.

Figure 10:
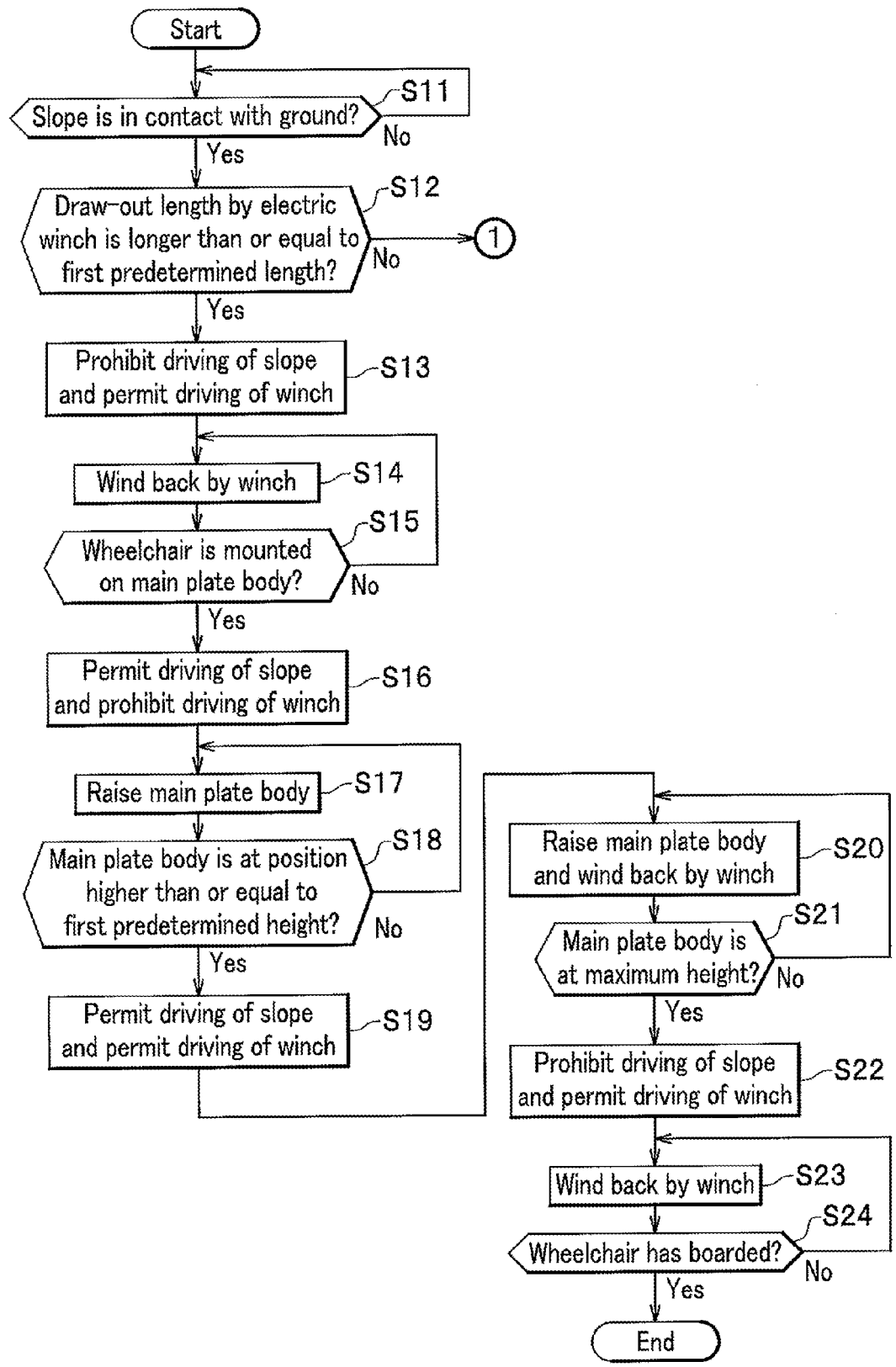
FIG. 10 is a flowchart for illustration of an example of the operation of the mounting device.
Figure 11:
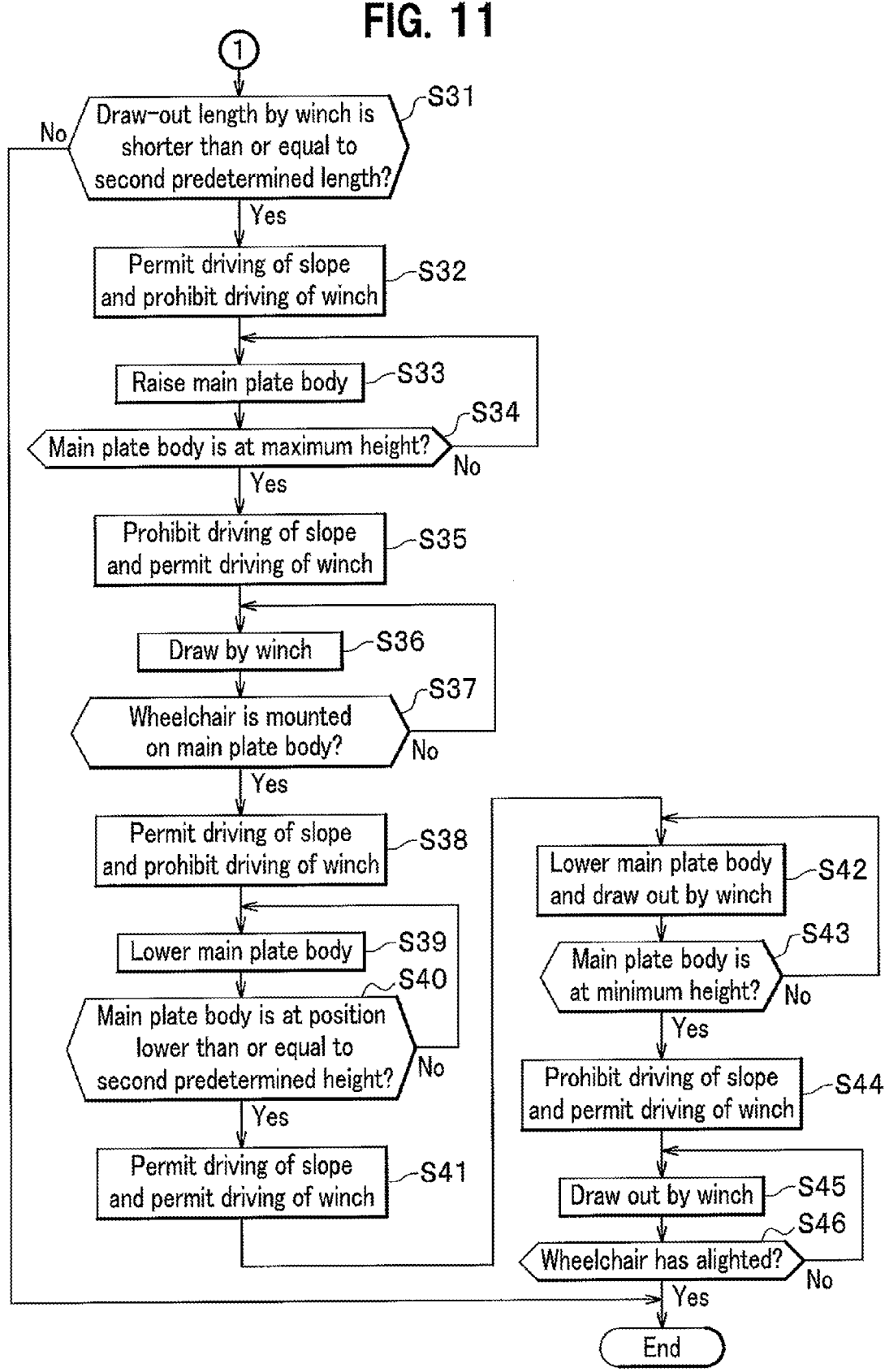
FIG. 11 is a flowchart for illustration of an example of the operation of the mounting device.
Figure 12:
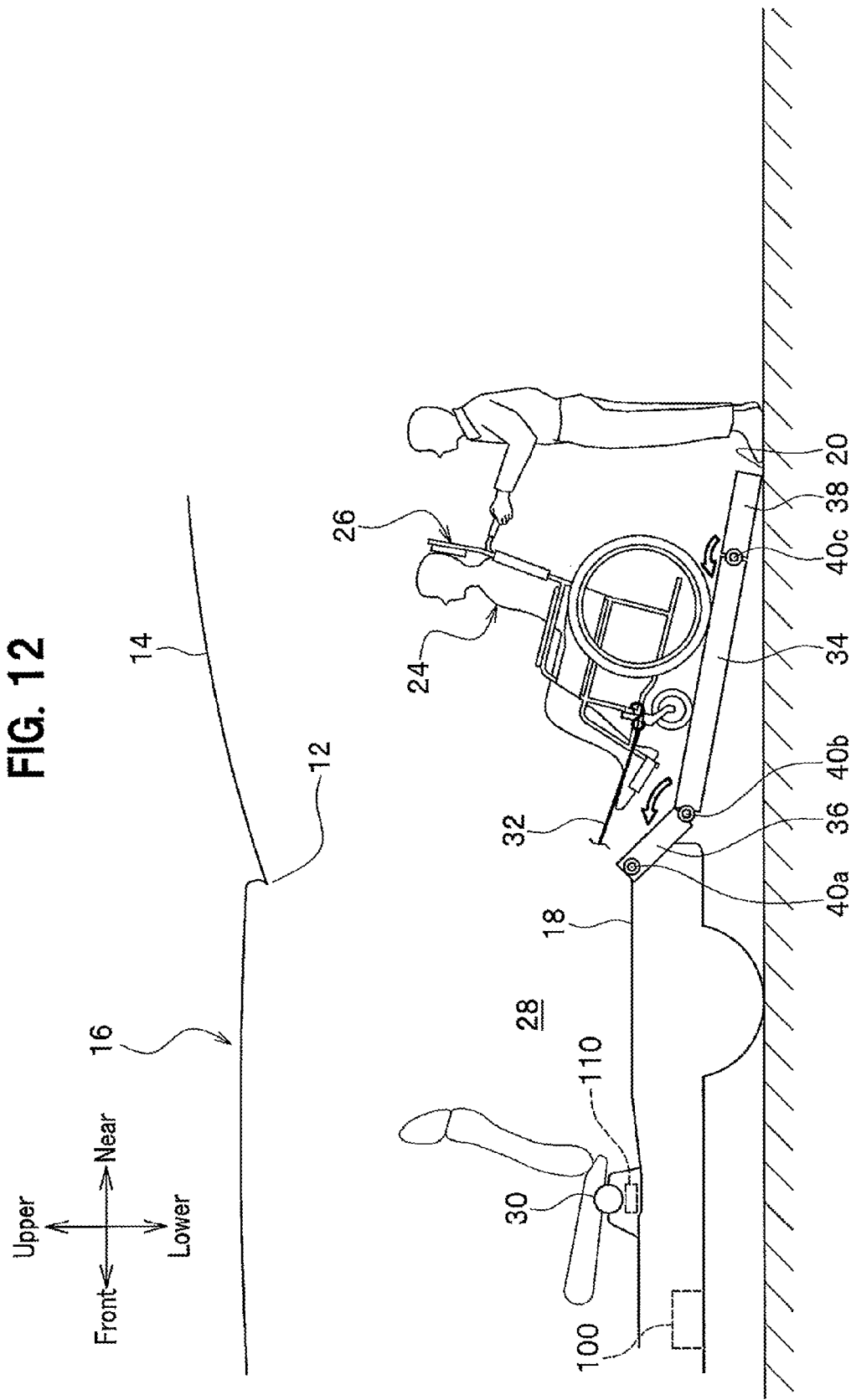
FIG. 12 is a side view showing a state that a wheelchair has moved from the state shown in FIG. 1, and the wheelchair is mounted on a main plate body located at a low position.
Figure 13:
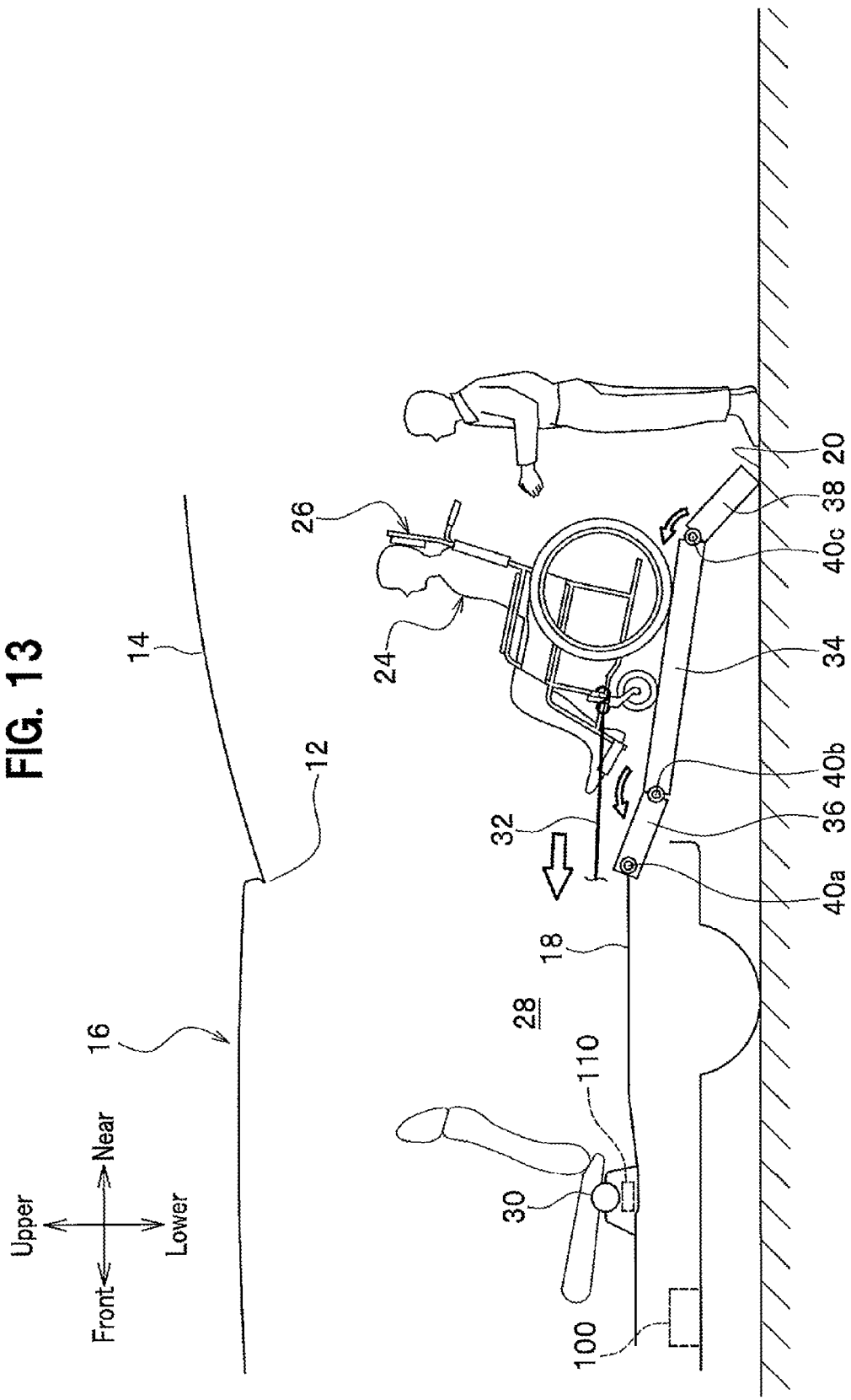
FIG. 13 is a side view showing a state that the main plate body has been displaced from the low position to a first intermediate position, while the wheelchair remains mounted on the main plate body.
Figure 14:
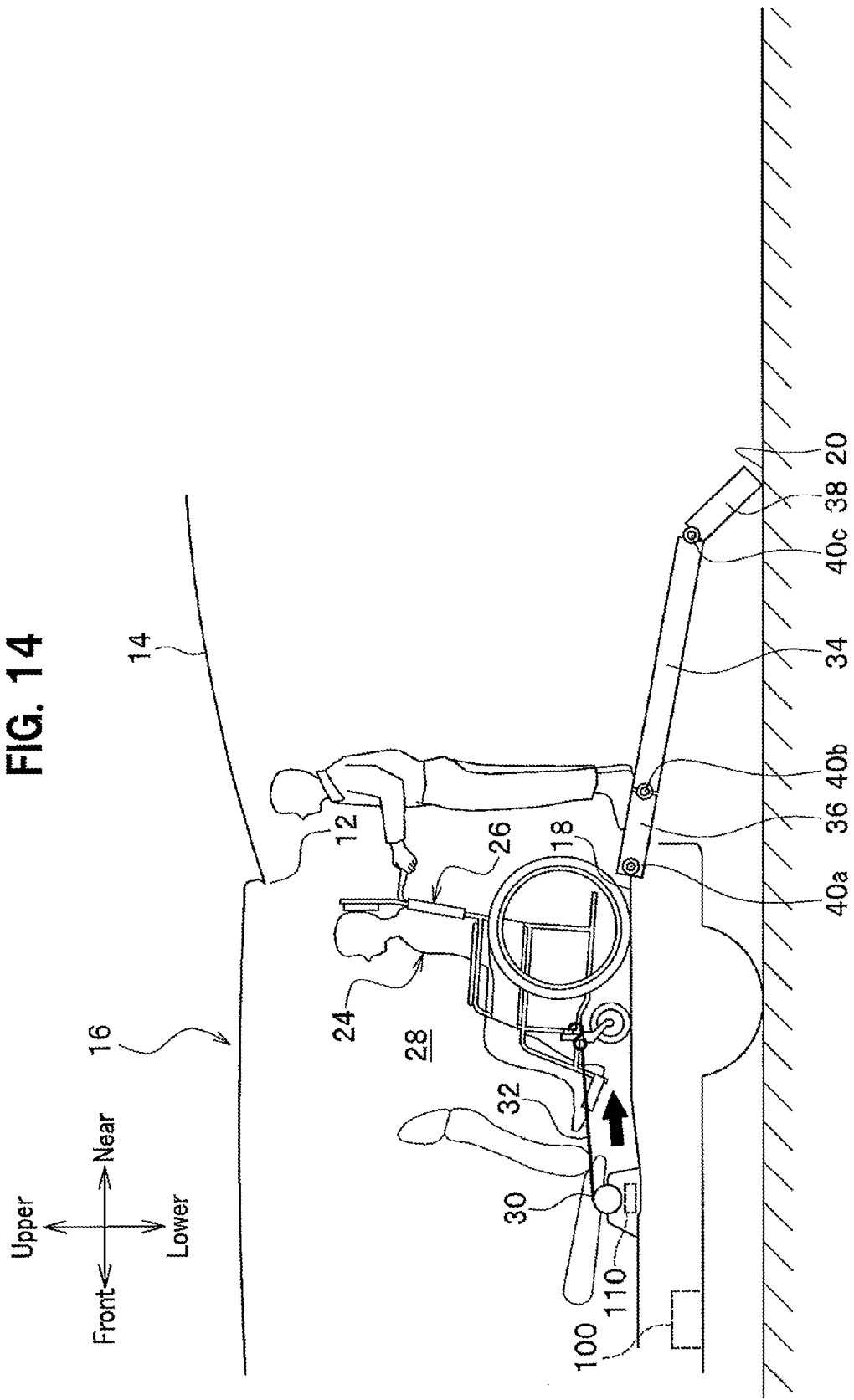
FIG. 14 is a side view showing a state that the wheelchair has moved and reached a space at the rear part of the vehicle compartment.
Figure 15:
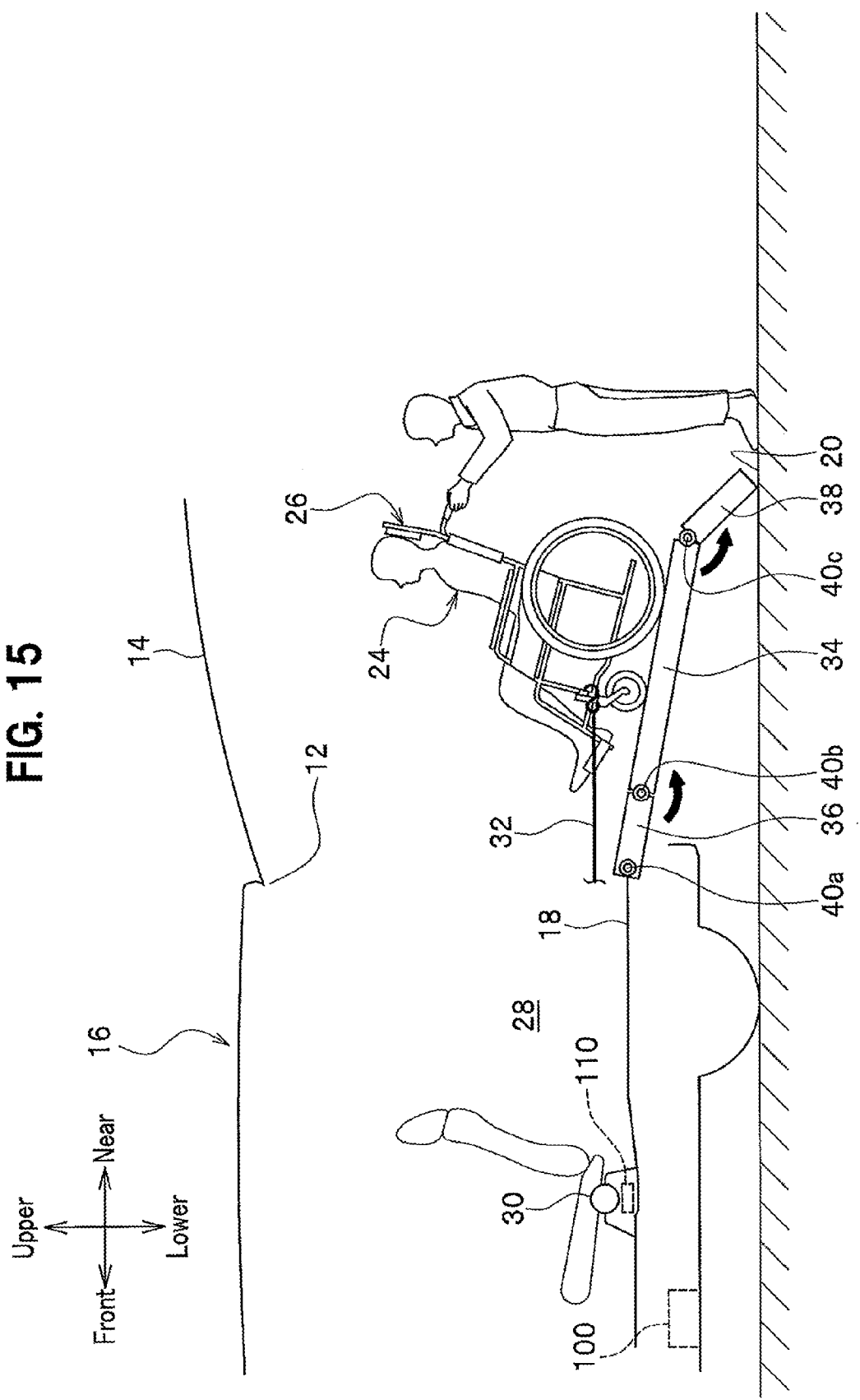
FIG. 15 is a side view showing a state that the wheelchair has moved from the state shown in FIG. 14, and the wheelchair is mounted on the main plate body at a high position.
Figure 16:
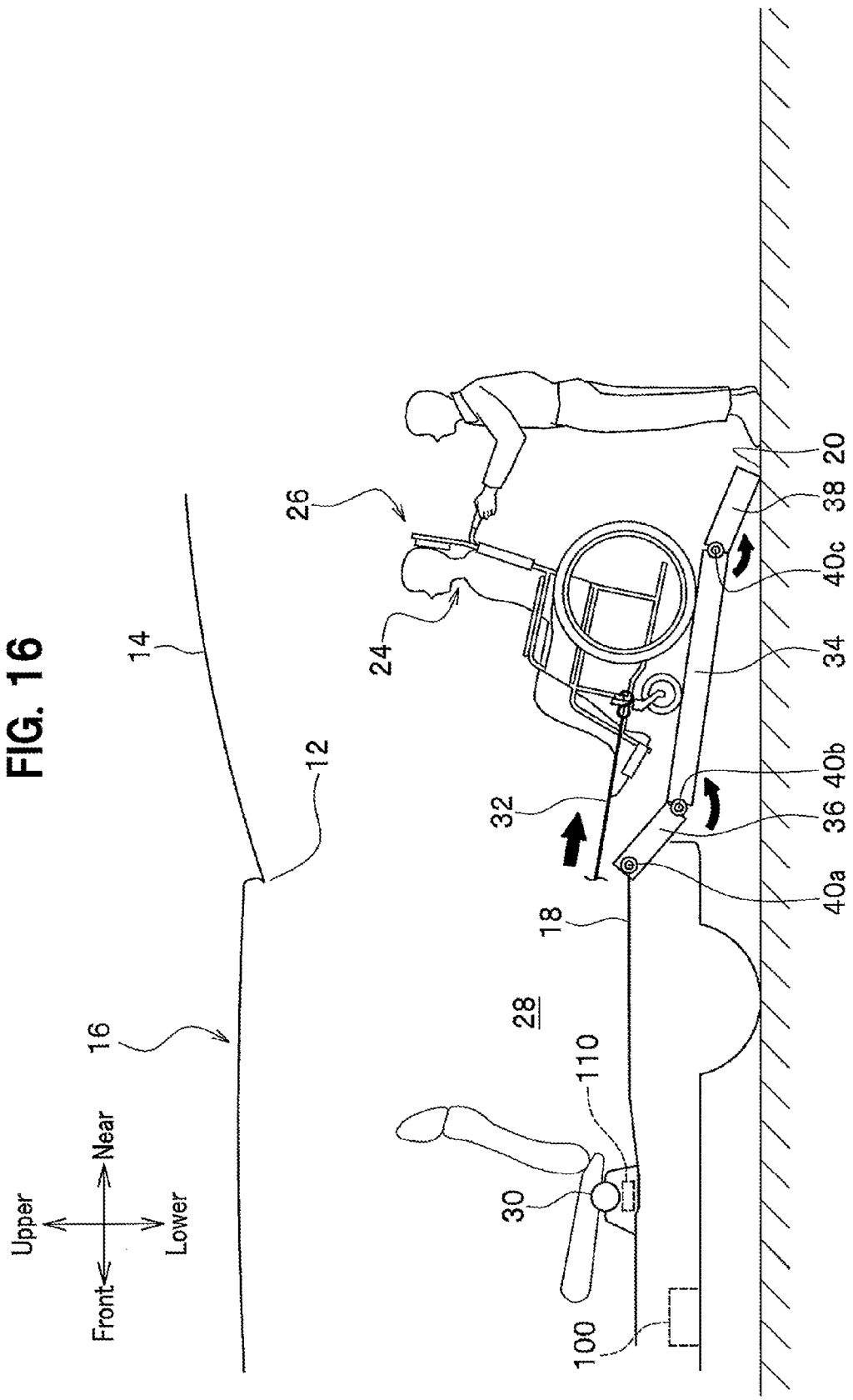
FIG. 16 is side view showing a state that the main plate body has been displaced from the high position to a second intermediate position, while the wheelchair remains mounted on the main plate body.

FIG. 10 and FIG. 11 are flowcharts for illustration of an example of the operation of the mounting device. FIG. 12 is a side view showing a state that a wheelchair has moved from the state shown in FIG. 1 and is mounted on the main plate body located at the low position. FIG. 13 is a side view showing a state that the main plate body has been displaced from the low position to a first intermediate position, while the wheelchair remains mounted on the main plate body. FIG. 14 is a side view showing a state that the wheelchair has moved and reached a space at the rear part of the vehicle compartment. FIG. 15 is a side view showing a state that the wheelchair has moved from the state shown in FIG. 14, and the wheelchair is mounted on the main plate body at a high position. FIG. 16 is side view showing a state that the main plate body has been displaced from the high position to a second intermediate position, while the wheelchair remains mounted on the main plate body. In FIGS. 1, 12 to 15, hollow arrows represent the movement direction of the belt 32 and the rotation direction of the second rotation shaft 40*b* and the third rotation shaft 40*c* in boarding the vehicle, and solid arrows represent the movement direction of the belt 32 and the rotation direction of the second rotation shaft 40*b* and the third rotation shaft 40*c* in alighting from the vehicle.

Herein, referring to FIG. 8, four positions taken by the slope 22 in boarding on the vehicle and alighting from the vehicle will be described.

(Low Position)

The slope 22 is located at the low position PL at a start of boarding on the vehicle. In the present embodiment, at the low position PL, the height HL of the main plate body 34 is at the lowest and the change in the gradient, with respect to the front-rear direction, of the third rotation shaft 40*c* is zero.

(High Position)

The slope 22 is located at the high position PH at a start of alighting from the vehicle. In the present embodiment, at the high position PH, the height HH of the main plate body 34 is at the highest and the change in the gradient, with respect to the front-rear direction, of the second rotation shaft 40*b* is zero.

(First Intermediate Position)

At the first intermediate position P1, which is important in controlling during boarding on the vehicle, the height H1 of the main plate body 34 is at the second highest following the height HH, and the change in gradient, with respect to front-rear direction, of the second rotation shaft 40*b* is not zero but small.

(Second Intermediate Position)

At the second intermediate position P2, which is important in controlling during alighting from the vehicle, the height H2 of the main plate body 34 is the second lowest following the height HL, and the change in gradient, with respect to front-rear direction, of the third rotation shaft 40*c* is not zero but small.

<In Boarding>

First, as shown in FIG. 1, the slope 22 stored in the vehicle compartment is moved to outside the vehicle, and the slope 22 is bridged between the vehicle body and the contact-ground surface 20 such that the main plate body 34 is located at the low position PL with respect to the upper-lower direction. At this low position PL, the axial line, with respect to the vehicle body front-rear direction, of the main plate body 34 and the axial line, with respect to the vehicle body front-rear direction, of the ground-contact-side plate body 38 are set on the same line, and the axial line, with respect to the vehicle body front-rear direction, of the vehicle-body-side plate body 36 is set in a state of inclining by a certain angle with a downward gradient toward the main plate body 34 side (the vehicle rear side). Herein, in the states of the slope 22 from the stored state to the standing fixed state, the clutch 68 of the switching mechanism 44 for the second rotation shaft 40*b* is set to ON state; the second rotation shaft 40*b* is set as $\theta2=180$ degrees; and the clutch 68 of the switching mechanism 44 for the third rotation shaft 40*c* is set to OFF state. For example, when the slope 22 is drawn out on the vehicle outer side compared with the stranding fixed state, based on a detection result obtained from the first slope angle detecting unit 101, the control section 100 performs control to rotate the second rotation shaft 40b, and further, when the slope 22 has come in contact with the contact-ground surface 20, based on respective detection results obtained from the slope angle detecting units 101 to 103, the control section 100 performs control to set the clutch 68 of the third rotation shaft 40c to ON state and rotate the third rotation shaft 40c to thereby set the slope 22 at the low position PL. During boarding operation and alighting operation after the slope 22 has been set to the low position PL, the clutches 68 of the switching mechanisms 44 at the second rotation shaft 40b and the third rotation shaft 40c are always in ON state. In this state, based on detection results obtained from the first to third slope angle detecting units 101 to 103 (possibly only a detection result obtained from the first slope angle detecting unit 101), the control section 100 determines whether or not the slope 22 is in contact with the ground (step S11).

Subsequently, the care taker draws the belt 32 from the drum 31 and makes the hook 32a of the electric winch 30 engaged and stopped by the wheelchair 26. In this state, if the care taker operates the remote controller, the control section 100 determines whether or not the draw-out length of the electric winch 30 is longer than or equal to a first predetermined length, based on a detection result obtained from the rotation amount detecting unit 111 (step S12).

Herein, the first predetermined length is set in advance as a length at a moment when the wheelchair 26 is neither in the vehicle compartment nor on the slope 22. If Yes in step S11 and Yes in step S12, then the control section 100 starts operation, of the wheelchair 26, for boarding. That is, the control section 100 prohibits driving of the slope 22 and permits driving of the electric winch 30 (step S13), and thus controls the winch driving mechanism 33. Thus, the control section 100 drives the electric winch 30 and winds back the belt 32, which is engaged and stopped by the wheelchair 26, by the drum 31 to thereby move the care receiver 24 along the slope 22 to the vehicle body side while the care receiver 24 remains riding on the wheelchair 26.

Incidentally, in the present operation example, based on detection results obtained from the rotation amount detecting units 111 respectively provided at the left-right pair of electric winches 30, 30, the control section 100 may perform respective controls when both detection results obtained from the both rotation amount detecting units 111 satisfy conditions, or, based on a detection result obtained from the rotation amount detecting unit 111 provided at one of the left-right pair of electric winches 30, 30, the control section 100 may perform controls, in association with each other, of the left-right pair of electric winches 30, 30.

Subsequently, based on a detection result obtained from the rotation amount detecting unit 111, the control section 100 determines whether or not the wheelchair 26 has been mounted on the main plate body 34 (step S15). As shown in FIG. 12, when the wheelchair 26 has become into a mounted state on the main plate body 34 (Yes in step S15), the control section 100 permits driving of the slope 22 and prohibits driving of the electric winch 30 (step S16). The control section 100 stops the winding-back operation of the electric winch 30, and as shown in FIG. 12, respectively rotates the second rotation shaft 40b and the third rotation shaft 40c in a predetermined direction, while the wheelchair 26 remains the mounted state on the main plate body 34, to thereby switch the state of the main plate body 34 from the low position PL to the first intermediate position P1 (step S17).

That is, by rotating the second rotation shaft 40b in a predetermined direction, the control section 100 makes the axial line, with respect to the vehicle body front-rear direction, of the vehicle-body-side plate body 36 and the axial line, with respect to the vehicle body front-rear direction, of the main plate body 34 come close to the same line. Simultaneously, by rotating the third rotation shaft 40c, the control section 100 makes a state that the axial line, with respect to the vehicle front-rear direction, of the ground-contact-side plate body 38 inclined by a certain angle with a downward gradient to the vehicle rear side.

Subsequently, based on detection results obtained from the second slope angle detecting unit 102 and the third slope angle detecting unit 103, the control section 100 determines whether or not the main plate body 34 is at a position higher than or equal to a first predetermined height H1 (in other words, whether or not the main plate body 34 has reached the first intermediate position P1 (step S18). If the main plate body 34 has become at a position higher than or equal to the first predetermined height (Yes in step S18), the control section 100 permits driving of both the slope 22 and the electric winch 30 (step S19). The control section 100 performs control to resume the winding-back operation of the drum of the electric winch 30 and to respectively rotate the second rotation shaft 40b and the third rotation shaft 40c in predetermined direction so as to switch the state of the main plate body 34 from the first intermediate position P1 to the high position PH shown in FIG. 8 (step S20).

Subsequently, based on detection results obtained from the second slope angle detecting unit 102 and the third slope angle detecting unit 103, the control section 100 determines whether or not the main plate body 34 is at position higher than or equal to the maximum height HH (in other words, whether or not the main plate body 34 has reached the high position PH) (step S21). If the main plate body 34 has become at a position of the maximum height HH (Yes in step 21), the control section 100 prohibits driving of the slope 22 and permits driving of the electric winch 30 (step S22).

In such a manner, in a state that the change in gradient, with respect to the front-rear direction, of the second rotation shaft 40b has become small, the control section 100 performs control to energize the electric winch 30 so as to start winding back of the belt 32 while the control section 100 raises the main plate body 34, and the care taker presses the wheelchair 26 along the slope 22 to the vehicle body side. Thus, the wheelchair 26 can be boarded at the position of a space 28 at the rear part of the vehicle compartment (see FIG. 14). Then, based on a detection result obtained from the rotation amount detecting unit 111, the control section 100 determines whether or not boarding of the wheelchair 26 is complete (in other words, whether or not the wheelchair 26 has reached the position of the space 28 at the rear part of the vehicle compartment) (step S24). If completion of boarding is determined (Yes in step 24), the control section 100 stops winding of the belt 32 of the electric winches 30 and terminates the operation flow in boarding.

<In Alighting>

If No in step S12, based on a detection result obtained from the rotation amount detecting unit 111, the control section 100 determines whether or not the draw-out length of the electric winch 30 is shorter than or equal to a second predetermined length (step S31).

Herein, the second predetermined length is set in advance as the length taken when the wheelchair 26 is in the vehicle compartment. If Yes in step S11, No in step S12, and Yes in step S31, the control section 100 starts operation for alighting of the wheelchair 26. That is, the control section 100 permits driving of the slope 22 and prohibits driving of the electric winch 30 (step S32) and respectively rotates the second rotation shaft 40*b* and the third rotation shaft 40*c* in a predetermined direction so as to switch the state of the main plate body 34 from the low position PL (see FIG. 1) to the high position PH (see FIG. 14) (step S33). Subsequently, based on detection results obtained from the second slope angle detecting unit 102 and the third slope angle detecting unit 103, the control section 100 determines whether or not the main plate body 34 is at the maximum height HH (in other words, whether or not the main plate body 34 has reached the high position PH) (step S34). When the main plate body 34 has become at the maximum height HH (Yes in step S34), the control section 100 prohibits driving of the slope 22 and permits driving of the electric winch 30 (step S35), controls the winch driving mechanism 33 to thereby energize the electric winch 30 and thus draw out the belt 32, which is engaged and stopped by the wheelchair 26, from the drum 31 (step S36). Thus, the wheelchair 26 is moved along the slope 22 to outside the vehicle while the care receiver 24 remains riding on the wheelchair 26.

Subsequently, based on a detection result obtained from the rotation amount detecting unit 111, the control section 100 determines whether or not the wheelchair 26 has been mounted on the main plate body 34 (step S37), and when the wheelchair 26 has become in a state that, as shown in FIG. 15, the wheelchair 26 is mounted on the main plate body 34 (Yes in step S37), the control section 100 permits driving of the slope 22 and prohibits driving of the electric winch 30 (step S38). The control section 100 stops draw-out operation by the drum of the electric winch 30 and respectively rotates the second rotation shaft 40*b* and the third rotation shaft 40*c* in a predetermined direction while holding the state, as shown in FIG. 16, that the wheelchair 26 is mounted on the main plate body 34. Thus, the control section 100 switches the state of the main plate body 34 from the high position PH to the second intermediate position P2 (step S39). That is, the control section 100 rotates the second rotation shaft 40*b* in the predetermined direction to thereby make the axial line, with respect to the vehicle body front-rear direction, of the ground-contact-side plate body 38 incline by a certain angle with a downward gradient toward the vehicle rear side. Simultaneously, the control section 100 rotates the third rotation shaft 40*c* to make the axial line, with respect to the vehicle body front-rear direction, of the ground-contact-side plate body 38 and the axial line, with respect to the vehicle body front-rear direction, of the main plate body 34 close to the same line.

Subsequently, based on detection results obtained from the second slope angle detecting unit 102 and the third slope angle detecting unit 103, the control section 100 determines whether or not the main plate body 34 is at a position lower than or equal to the second predetermined height H2 (in other words, whether or not the main plate body 34 has reached the second intermediate position P2) (step S40). When the main plate body 34 has become at a position lower than or equal to the second predetermined height H2 (Yes in step S40), the control section 100 permits driving of both the slope 22 and the electric winch 30 (step S41). The control section 100 resumes the draw-out operation by the drum of the electric winch 30 and respectively rotates the second rotation shaft 40*b* and the third rotation shaft 40*c* in a predetermined direction to switch the state of the main plate body 34 from the second intermediate position P2 to the low position PL, shown in FIG. 1 (step S42).

Subsequently, based on detection results obtained from the second slope angle detecting unit 102 and the third slope angle detecting unit 103, the control section 100 determines whether or not the main plate body 34 is at a position lower than or equal to the minimum height HL (in other words, whether or not the main plate body 34 has reached the low position PL) (step S43). When the main plate body 34 has become at a position of the minimum height HL (Yes in step S43), the control section 100 prohibits driving of the slope 22 and permits driving of the electric winch 30 (step S44).

In such a manner, in a state that the change in the gradient of the third rotation shaft 40*c* with respect to the front-rear direction has become small, the control section 100 energizes the electric winch 30 to start drawing out the belt 32 while moving down the main plate body 34, and the care taker draws the wheelchair 26 along the slope 22 to the outside of the vehicle. Thus, it is possible to make the wheelchair 26 alight from the vehicle (see FIG. 1). Then, based on a detection result obtained from the rotation amount detecting unit 111, the control section 100 determines whether or not alighting of the wheelchair 26 has been completed (in other words, whether or not the wheelchair 26 has reached the position outside the vehicle) (step S46). If it is determined that alighting has been completed (Yes in step S46), the control section 100 stops drawing out the belt 32 of the electric winch 30 and terminates the operation flow in alighting.

After completion of alighting, the care taker makes the slope 22 to become in the stored state, and operates the remote controller, in a state that the hook 32*a* of the electric winch 30 is stored in the storing section 201. In response to such operation of the remote controller, the control section 100 controls driving of the winch driving mechanism 33 to thereby wind back the belt 32 and terminates winding back in a state that the slack of the belt 32 is removed. In such a state, the control section 100 resets the detection result obtained from the rotation amount detecting unit 111.

The mounting device 10 in the present embodiment of the invention can control the slope 22 and the electric winch 30, making the slope 22 and the electric winch 30 collaborate with each other, and more smoothly move the wheelchair 26 as an object to be mounted.

Further, when either one motor 33 of the slope driving mechanism 42 or the electric winch 30 is driving, by prohibiting driving of the other one motor 33, the mounting device 10 prevents simultaneous operation of the slope 22 and the electric winch 30 so that, for example, strange feeling given to the care receiver 24 on the wheelchair 26 can be reduced.

Further, based on the height of the main plate body 34, which is an example of the driving state of the slope driving mechanism 42, the mounting device 10 can control the slope 22 and the electric winch 30, making the slope 22 and the electric winch 30 collaborate with each other so that the wheelchair 26 can be more smoothly moved.

Still further, as the mounting device 10 makes the wheelchair 26 pass unevennesses formed on the slope 22 in a state that the unevenesses are small, it is possible, for example, to shorten the time taken in boarding or alighting of the wheelchair 26 while reducing strange feeling given to the care receiver 24 on the wheelchair 26.

Yet further, based on the rotation angle of a rotational shaft, which is an example of the driving state of the slope driving mechanism 42, the mounting device 10 controls the slope 22 and the electric winch 30, making the slope 22 and the electric winch 30 collaborate with each other, which enables smoother movement of the wheelchair 26.

Further, based on the rotation amount pf the drum 31, which is an example of driving state of the electric winch 30, the mounting device 10 can control the slope 22 and the electric winch 30, making the slope 22 and the electric winch 30 collaborate with each other, which enables smoother movement of the wheelchair 26.

Still further, the mounting device 10 more accurately computes the position of the wheelchair 26 also taking into account the thickness of the belt 32, and based on a result of this computation, the mounting device 10 can control the slope 22 and the electric winch 30, making the slope 22 and the electric winch 30 collaborate with each other, which enables smoother movement of the wheelchair 26.

Yet further, the mounting device 10 can reduce occurrence of error in the rotation amount detecting unit 111 caused by plural times of usage.

An embodiment of the present invention has been described above, however, the invention is not limited to the above-described embodiment, and modifications and changes can be made, as appropriate, without departing from the spirit of the invention. For example, the height of the main plate body 34 is not limited to a height on a basis of the contact-ground surface 20, and may be, for example, a height on a basis of the first rotation shaft 40a.

DESCRIPTION OF REFERENCE SYMBOLS

10 . . . mounting device (mounting device for an object to be mounted)
16 . . . vehicle
20 . . . contact-ground surface
22 . . . slope
26 . . . wheelchair (object to be mounted)
34 . . . main plate body
36 . . . vehicle-body-side plate body
38 . . . ground-contact-side plate body
40a-40c . . . rotation shaft
42 . . . driving mechanism (slope driving mechanism)
44 . . . switching mechanism (slope driving unit)

The invention claimed is:

1. A mounting device for an object to be mounted, comprising:
a slope including a main plate body onto which an object to be mounted is mounted, a vehicle-body-side plate body formed by at least one plate body and arranged between one end of the main plate body and a vehicle body, and a ground-contact-side plate body formed by at least one plate body and arranged between the other end of the main plate body and a contact-ground surface, wherein the main plate body is movable up and down between a low position and a high position in a state that the ground-contact-side plate body is in contact with ground;
a winch capable of towing the object to be mounted along the slope;
a slope driving unit for driving the main plate body; and
a control unit that, based on driving state of either one of the slope driving unit and the winch, controls driving state of the other one of the slope driving unit and the winch.

2. The mounting device for an object to be mounted according to claim 1,
wherein, when either one of the slope driving unit and the winch is driving, the control unit prohibits driving of the other one of the slope driving unit and the winch.

3. The mounting device for an object to be mounted according to claim 1, comprising:
a slope height detecting unit for detecting height of the main plate body,
wherein the control unit switches permission and prohibition of driving of the winch, based on the height of the main plate body.

4. The mounting device for an object to be mounted according to claim 3,
wherein, when the main plate body moves up, if the main plate body is at a position higher than or equal to a first predetermined height, the control unit permits driving of the winch toward a boarding direction.

5. The mounting device for an object to be mounted according to claim 3,
wherein, when the main plate body moves down, if the main plate body is at a position lower than or equal to a second predetermined height, the control unit permits driving of the winch toward an alighting direction.

6. The mounting device for an object to be mounted according to claim 1,
wherein the slope includes plural rotation shafts provided between the vehicle body and the vehicle-body-side plate body and between the respective plate bodies,
wherein the mounting device comprises a slope angle detecting unit for detecting rotation angle of the rotation shaft,
and wherein the control unit switches permission and prohibition of driving of the winch by the winch driving unit, based on the rotation angle.

7. The mounting device for an object to be mounted according to claim 1,
wherein the winch includes a towing member connected to the object to be mounted and a drum capable of winding back and drawing out the towing member,
wherein the mounting device comprises a rotation amount detecting unit for detecting a rotation amount of the drum,
and wherein the control unit switches permission and prohibition of driving of the slope driving unit, based on the rotation amount.

8. The mounting device for an object to be mounted according to claim 7,
wherein the control unit computes a draw-out length of the towing member from the drum, based on the rotation amount and thickness of the towing member, and switches permission and prohibition of driving of driving of the slope driving unit, based on the draw-out length.

9. The mounting device for an object to be mounted according to claim 7,
wherein the mounting device comprises a storage detecting unit for detecting a fact that the towing member has been stored in the storing section,
and wherein, when the towing member has been stored into the storing section, the control unit resets a detection result obtained from the rotation amount detecting unit.

10. The mounting device for an object to be mounted according to claim 4,
wherein, when the main plate body moves down, if the main plate body is at a position lower than or equal to a second predetermined height, the control unit permits driving of the winch toward an alighting direction.

11. The mounting device for an object to be mounted according to claim 8,
wherein the mounting device comprises a storage detecting unit for detecting a fact that the towing member has been stored in the storing section, and wherein, when the towing member has been stored into the storing section, the control unit resets a detection result obtained from the rotation amount detecting unit.

* * * * *